United States Patent
Brewington et al.

(10) Patent No.: US 10,296,525 B2
(45) Date of Patent: May 21, 2019

(54) PROVIDING GEOGRAPHIC LOCATIONS RELATED TO USER INTERESTS

(71) Applicant: Google Inc., Mountain View, CA (US)

(72) Inventors: Brian Brewington, Superior, CO (US); Sujoy Banerjee, San Francisco, CA (US); Fritz Obermeyer, Berkeley, CA (US)

(73) Assignee: Google LLC, Mountain View, CA (US)

( * ) Notice: Subject to any disclaimer, the term of this patent is extended or adjusted under 35 U.S.C. 154(b) by 337 days.

(21) Appl. No.: 15/130,738

(22) Filed: Apr. 15, 2016

(65) Prior Publication Data

US 2017/0300511 A1   Oct. 19, 2017

(51) Int. Cl.
*G06F 17/30* (2006.01)
*G06F 16/29* (2019.01)
(Continued)

(52) U.S. Cl.
CPC ............ *G06F 16/29* (2019.01); *G06F 16/248* (2019.01); *G06F 16/252* (2019.01);
(Continued)

(58) Field of Classification Search
CPC ......... G06F 17/30241; G06F 17/30554; G06F 17/3056; G06F 17/3087
See application file for complete search history.

(56) References Cited

U.S. PATENT DOCUMENTS

| | | |
|---|---|---|
| 8,793,248 B2 | 7/2014 | Friedmann et al. |
| 9,014,726 B1 | 4/2015 | Foster |

(Continued)

FOREIGN PATENT DOCUMENTS

| | | |
|---|---|---|
| CN | 103064924 A | 4/2013 |
| WO | 2014/204463 A1 | 12/2014 |
| WO | 2015/200350 | 12/2015 |

OTHER PUBLICATIONS

European Patent Office, International Search Report for International Patent Application No. PCT/US2016/068433, dated Apr. 5, 2017, 5 pages.

(Continued)

*Primary Examiner* — Huawen A Peng
(74) *Attorney, Agent, or Firm* — IP Spring

(57) ABSTRACT

Implementations relate to providing geographic locations related to user interests. In some implementations, a method includes receiving an indication of a user location and determining one or more subjects of interest to the user based on examining a collection of images associated with the user. The subjects of interest are determined by determining distinctive image characteristics that have a higher frequency in the collection of user images compared to a frequency of similar stored image characteristics of a population of images associated with multiple users. Site characteristics of a geographic area are obtained based on images captured in the geographic area. The site characteristics are compared to the subjects of interest and one or more geographic locations in the geographic area are determined that have site characteristics similar to the subjects of interest. The geographic locations are provided to be output by the user device.

19 Claims, 8 Drawing Sheets

(51) Int. Cl.
*G06F 16/248* (2019.01)
*G06F 16/25* (2019.01)
*G06F 16/9537* (2019.01)

(52) U.S. Cl.
CPC ...... *G06F 16/9537* (2019.01); *G06F 17/3056* (2013.01); *G06F 17/3087* (2013.01); *G06F 17/30241* (2013.01); *G06F 17/30554* (2013.01)

(56) References Cited

U.S. PATENT DOCUMENTS

| | | |
|---|---|---|
| 2006/0238379 A1 | 10/2006 | Kimchi et al. |
| 2010/0280920 A1 | 11/2010 | Scott et al. |
| 2011/0184949 A1 | 7/2011 | Luo |
| 2011/0184953 A1 | 7/2011 | Joshi et al. |
| 2014/0007010 A1 | 1/2014 | Blom |
| 2016/0169695 A1* | 6/2016 | Hall .................. G06Q 30/0261 701/426 |

OTHER PUBLICATIONS

European Patent Office, Written Opinion for International Patent Application No. PCT/US2016/068433, dated Apr. 5, 2017, 9 pages.
Brown, Barry et al., "Sharing the square: Collaborative Leisure in the City Streets," Proceedings of the Ninth European Conference on Computer-Supported Cooperative Work, Sep. 18-22, 2005, Paris, France, pp. 427-447.
Zheng, V. et al., "Collaborative Location and Activity Recommendations with GPS History Data," Hong Kong University of Science and Technology, WWW 2010, Association for Computing Machinery, Inc., Apr. 25, 2010, 10 pages.
Zheng, Yu, "GeoLife: Building social networks using human location history," Microsoft Research, accessed Jul. 1, 2014, 4 pages.
USPTO, "Area Modeling by Geographic Photo Label Analysis," U.S. Appl. No. 14/817,564, filed Aug. 4, 2015.
International Bureau of WIPO, International Preliminary Report on Patentability for International Patent Application No. PCT/US2016/068433, dated Oct. 16, 2018, 8 pages.

* cited by examiner

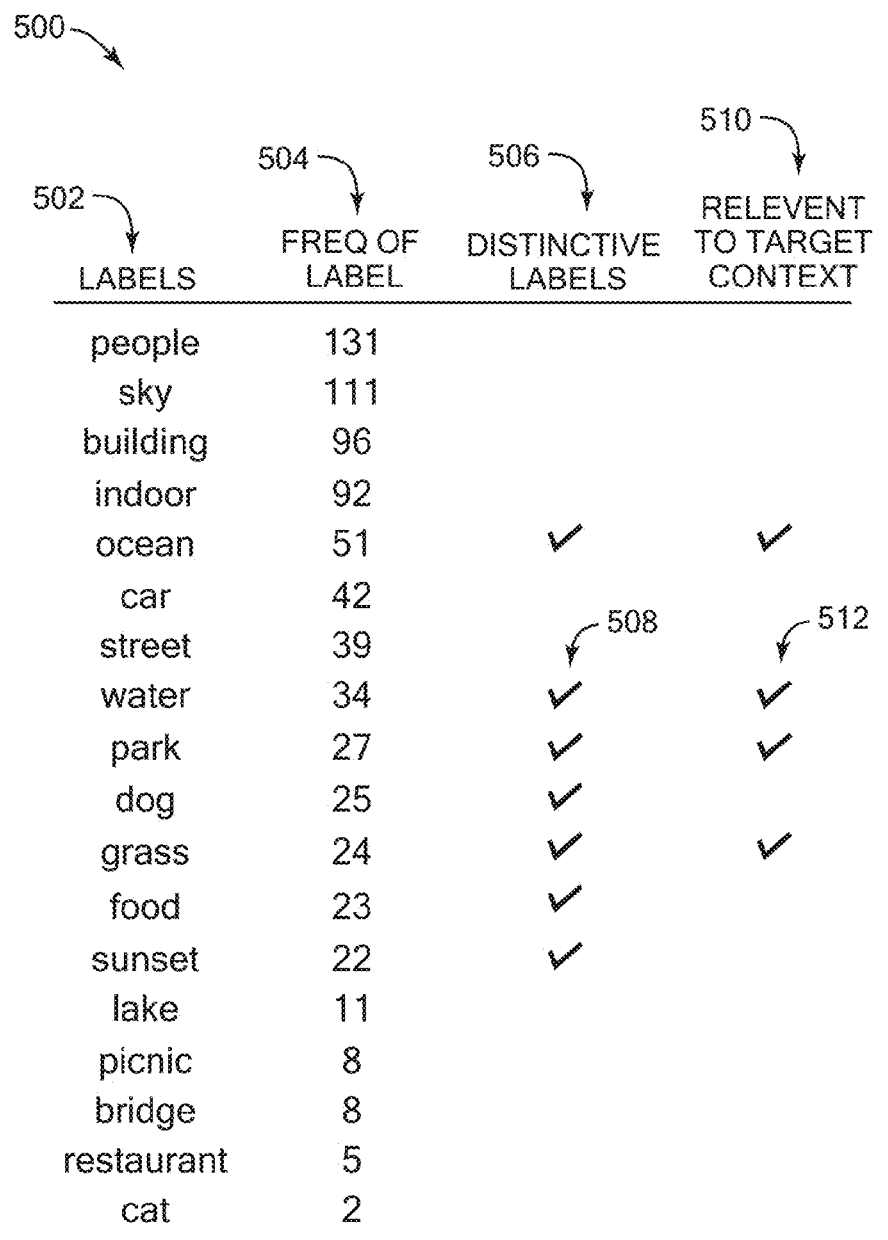

| LABELS (502) | FREQ OF LABEL (504) | DISTINCTIVE LABELS (506) | RELEVENT TO TARGET CONTEXT (510) |
|---|---|---|---|
| people | 131 | | |
| sky | 111 | | |
| building | 96 | | |
| indoor | 92 | | |
| ocean | 51 | ✓ | ✓ |
| car | 42 | | |
| street | 39 | ✓ (508) | ✓ (512) |
| water | 34 | ✓ | ✓ |
| park | 27 | ✓ | ✓ |
| dog | 25 | ✓ | |
| grass | 24 | ✓ | ✓ |
| food | 23 | ✓ | |
| sunset | 22 | ✓ | |
| lake | 11 | | |
| picnic | 8 | | |
| bridge | 8 | | |
| restaurant | 5 | | |
| cat | 2 | | |

FIG. 5

PROVIDING GEOGRAPHIC LOCATIONS RELATED TO USER INTERESTS

BACKGROUND

The popularity and convenience of digital cameras as well as the widespread of use of Internet communications have caused user-produced images such as photographs to become ubiquitous. For example, many users keep large collections of digital images they have captured or obtained from various sources. Many users of Internet platforms and services such as email, bulletin boards, forums, websites, photo sharing services, social networking services, and other online and network services provide images for themselves and others to see. A user's images may be associated with geographic location data and time data describing the location and time of capture of the images.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of the present application relate to providing geographic locations related to user interests. In some implementations, a computer-executed method includes receiving an indication of a geographic user location of a user and determining one or more subjects of interest to the user based on examining a collection of user images associated with the user. Determining the one or more subjects of interest includes determining distinctive image characteristics that have a higher frequency in the collection of user images compared to a frequency of similar stored image characteristics of a population of images associated with a plurality of users. The method includes obtaining site characteristics of a geographic area relative to the user location, where the site characteristics are based on a plurality of images captured in the geographic area. The method includes comparing the site characteristics of the geographic area to the one or more subjects of interest to the user, determining one or more geographic locations in the geographic area that have one or more site characteristics similar to the one or more subjects of interest to the user, and providing at least one of the one or more geographic locations to be output by the user device as at least one recommended location for the user.

Various implementations and examples of the method are described. For example, the one or more subjects of interest can be based on labels describing content depicted in the images. The method can further include selecting the geographic area based on the geographic area being within a threshold distance of the user location. The subjects of interest can be determined based on images in the collection of user images that, for example, are determined to have been captured at a similar time of day as a current time of day, and/or have been determined to have been captured at locations that do not include a home location and a work location of the user. The subjects of interest can be associated with a user context of the user, where the subjects of interest are determined based on images of the collection of user images that have metadata related to the user context. The geographic user location can be a current geographic location of the user device, or can be a designated geographic location determined based on user input received at the user device from the user. Determining one or more geographic locations can include determining that the one or more site characteristics are included in one or more categories in which the one or more subjects of interest are classified. The site characteristics can include times of capture of the plurality of images and descriptors of content depicted in the plurality of images. The site characteristics can have a higher frequency in the plurality of images captured in the geographic area compared to stored image characteristics of a set of images captured in a geographic region larger than the geographic area.

In some implementations, a computer readable medium can have stored thereon software instructions that, when executed by a processor, cause the processor to perform operations. The operations include determining one or more subjects of interest to a user based on examining characteristics of a collection of user images associated with the user, where the one or more subjects of interest are based on a frequency of image characteristics of the user images. The operations include receiving an indication of a user context including a geographic location and a time, and determining a set of the one or more subjects of interest that are associated with the user context. The operations include obtaining a plurality of site characteristics of a geographic area within a threshold distance of the geographic location, where the site characteristics are based on a plurality of images captured in the geographic area, and comparing the site characteristics of the geographic area to the set of the one or more subjects of interest to the user. The operations include determining one or more geographic locations in the geographic area that have one or more site characteristics similar to at least one of the set of one or more subjects of interest to the user, and providing at least one of the one or more geographic locations to be output by the user device as at least one recommended location for the user.

In various implementations of the computer readable medium, the site characteristics and the one or more subjects of interest can be based on labels describing content depicted in the images. The one or more subjects of interest can be additionally based on the most common of the image characteristics in the collection of user images. Determining a set of the one or more subjects of interest that are associated with the user context can include selecting the set of subjects of interest based on images of the collection of user images that have metadata related to the time of the user context. Determining the set of the one or more subjects of interest can include selecting the set of subjects of interest based on images of the collection of user images that have metadata associated with a type of the location of the user context.

In some implementations, a system includes a storage device and at least one processor configured to access the storage device and configured to perform operations including receiving an indication of a context of a user including a geographic user location of a user and determining one or more subjects of interest to the user based on examining a collection of user images associated with the user. The one or more subjects of interest are based on a comparison of a frequency of image characteristics in the collection of user images with a frequency of similar stored image characteristics of a population of images associated with a plurality of users. The operations include obtaining a plurality of site characteristics of a geographic area within a threshold distance of the user location and comparing the site characteristics of the geographic area to the one or more subjects of interest to the user. The operations include determining one or more geographic locations in the geographic area that have one or more site characteristics similar to the one or more subjects of interest to the user, and providing at least one of the one or more geographic locations to be output by the user device as at least one recommended location for the user.

Various implementations and examples of the system are described. For example, the site characteristics can include times of capture of the plurality of images and labels describing content depicted in the plurality of images. The processor can determine one or more subjects of interest including determining a status of the user, and selecting subjects of interest relevant to the status of the user, including basing the selection of the subjects of interest on images of the collection of user images having metadata associated with the status of the user. The geographic user location can be a current geographic location of the user device, or a designated geographic location determined based on user input received at the user device from the user.

BRIEF DESCRIPTION OF THE DRAWINGS

FIG. 5 is a diagrammatic illustration of an example table showing example image labels and results of processing the labels, according to some implementations;

DETAILED DESCRIPTION

Figure 1:
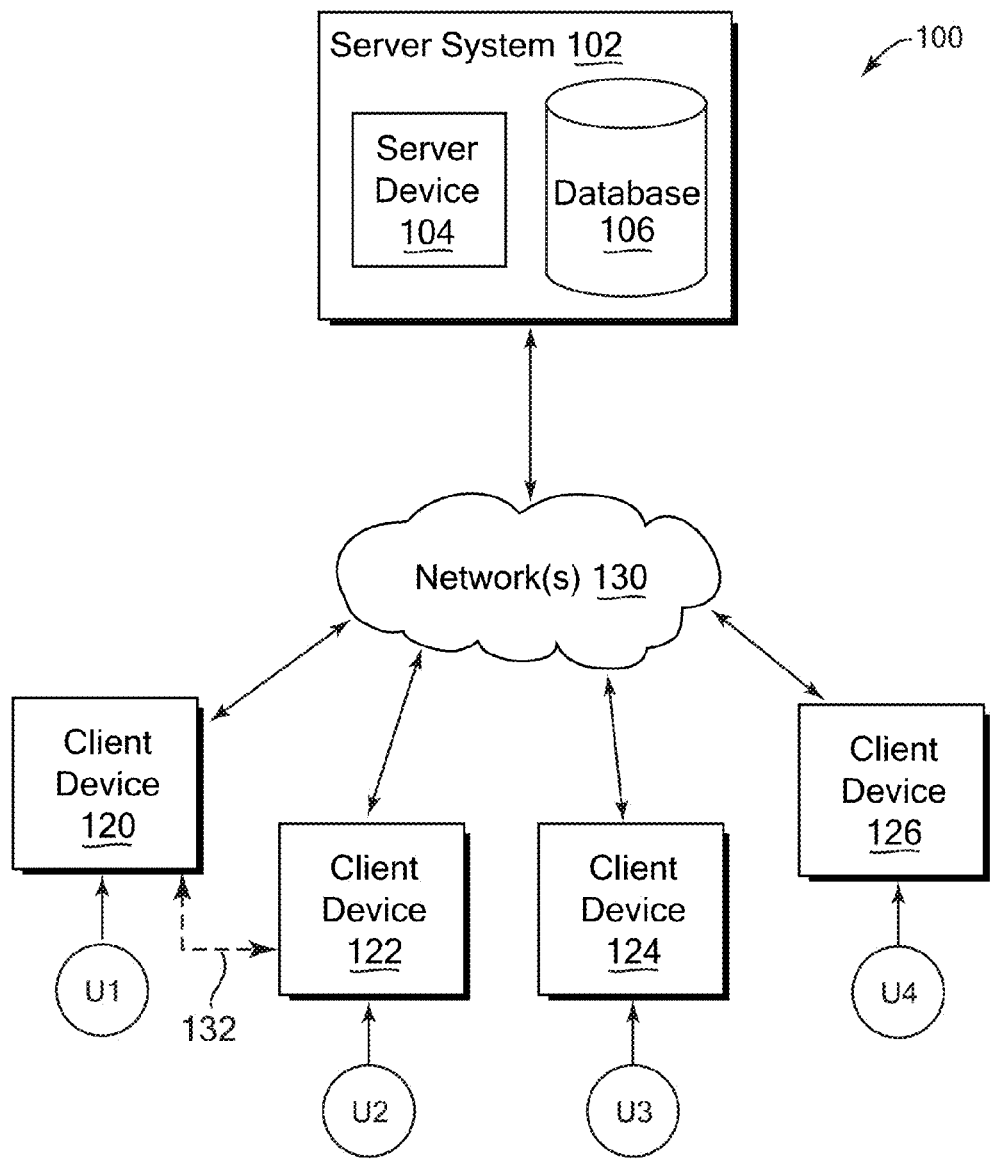
FIG. 1 is a block diagram of an example network environment which may be used for one or more implementations described herein.

One or more implementations described herein relate to providing geographic locations related to user interests. In some implementations, a system can notify a user or otherwise output one or more recommended geographic locations that are related to user interests, including interests such as photography and photo-taking opportunities or other user interests. Particular times or time periods, activities, and other information of interest with respect to the recommended locations can also be output as recommendations.

The user's subjects of interest are determined by examining the user's collection of images (e.g., photos and movies), if user consent has been obtained. For example, the system can examine image characteristics such as geographic location, timestamps, and descriptive labels describing image content. The system can determine or obtain distinctive characteristics of the user's images as subjects of user interest. A distinctive characteristic can be determined by examining the frequency of the characteristic (e.g., label) in the user's collection of images and comparing that frequency to an aggregated frequency of that characteristic (e.g., label) occurring in a population of images associated with multiple users, e.g., the collections of images of many users (if consent of the users has been obtained). A characteristic having a higher frequency in the user's collection as compared to that characteristic's frequency in the population of images can be considered distinctive. In some examples, a set of most common and distinctive characteristics of the user's images can be determined to define the subjects of interest to the user.

Geographic locations relevant to the user (and relevant time periods at those locations) are determined by comparing the subjects of user interest to site characteristics of locations in a geographic area relative to (e.g., surrounding) the user's location. The site characteristics can include labels describing image content from images that have been captured in or otherwise associated with the geographic area, e.g., images obtained from various sources. In some cases, the site characteristics can be based on distinctive labels having a higher frequency in the images of the geographic area compared to similar labels in a larger population of images captured in a geographic region larger than the geographic area.

The system can determine recommended geographic locations that have site characteristics similar to the subjects of interest of the user. These geographic locations can be output by the user device. Some implementations can determine the user's subjects of interest as relevant to a target context, e.g., a current or designated location, time (e.g., time period), status, activity, etc. of the user. For example, particular subjects of interest can be associated with particular types of user contexts (e.g., locations such as restaurant, playground, etc., time of day, particular activities, etc.). A particular set of subjects of interest can be selected which are related to the user context, and this set of subjects can be compared to site characteristics to find recommended geographic locations and time periods at those locations that are relevant to the user context.

Features described herein allow geographic locations and associated time periods of likely interest to a user to be found and recommended to a user using a user device. A user's collection of images can be used to automatically determine subjects of interest to a user, e.g., photographic interests and/or other types of interests. Subjects of user interest can be more accurately determined by finding distinctive descriptors of user image content that have a higher frequency of appearance than in an average population of images or average user image collection, enabling geographic locations (and times at the locations) similar to the accurate subjects of interest to be recommended to the user. Geographic locations can be characterized by distinctive site characteristics that can be matched to the subjects of user interest. Subjects of interest can be filtered or determined with respect to a target user context, including time, status, and activity, allowing geographic locations that are relevant to a user's interests and context to be found and recommended by a system.

The described features can provide efficient determination of user interests and geographical location and time characteristics based on images having associated and preprocessed descriptive labels and other metadata. This can allow a device with relatively low computational resources to efficiently compare user interests and site characteristics without significant time and processing requirements. Providing recommendations to users of relevant geographic locations, times, activities, and other contextual information can be performed upon user request, and/or performed automatically under particular conditions. Described techniques allow avoidance of extensive and tedious manual reviewing of locations, maps, and information by a user to determine relevant locations and location times of interest. Consequently, a technical effect of one or more described implementations is that search, organization, access, and presentation of geographic locations is reduced in computational time and resources expended to obtain results. For example, a technical effect of described features is a reduction in the problem of consumption of system processing resources required for determination and display of location and other related information that may otherwise be used by a system to provide manual searching for relevant locations. In another example, a technical effect of described features is a more comprehensive recommendation of relevant locations than would be feasible from manual selection of locations from a large set of data.

An "image" as referred to herein can be a still image, single image, or standalone image, or can be an image included in a series of images, e.g., a frame in a video sequence of video frames, or an image in a different type of sequence or collection of images. For example, implementations described herein can be used with single images (photos) or with one or more images in a sequence or in a video. An image can also be a panoramic image, a three-dimensional (3D) capture (e.g., spherical image), or other form of image. For example, a single image may be an aggregation or combination of multiple "sub-images" captured near in time and/or space.

One or more systems and methods discussed herein do not require collection or usage of user personal information. In situations in which certain implementations discussed herein may collect or use personal information about users (e.g., user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

FIG. 1 illustrates a block diagram of an example network environment 100, which may be used in some implementations described herein. In some implementations, network environment 100 includes one or more server systems, e.g., server system 102 in the example of FIG. 1. Server system 102 can communicate with a network 130, for example. Server system 102 can include a server device 104 and a database 106 or other storage device. Network environment 100 also can include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication 132 between devices, e.g., using peer-to-peer wireless protocols.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In some examples, database 106 and/or other storage devices can be provided in server system block(s) that are separate from server device 104 and can communicate with server device 104 and other server systems via network 130. Also, there may be any number of client devices. Each client device can be any type of electronic device, e.g., a desktop computer, laptop computer, portable or mobile device, cell phone, smart phone, tablet computer, television, TV set top box or entertainment device, wearable devices (e.g., display glasses or goggles, wristwatch, headset, armband, jewelry, etc.), personal digital assistant (PDA), media player, game device, etc. Some client devices may also have a local database similar to database 106 or other storage. In other implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some example implementations, users U1, U2, U3, and U4 may interact with each other via applications running on respective client devices and/or server system 102. In some implementations, the interaction may be performed via a network service, e.g., a social network service or other type of network service implemented on server system 102. For example, respective client devices 120, 122, 124, and 126 may communicate data to and from one or more server systems (e.g., system 102). In some implementations, server system 102 may provide appropriate data to the client devices such that each client device can receive communicated content or shared content uploaded to the server system 102 and/or network service. In some examples, the network service can include any system allowing users to perform a variety of communications, form links and associations, upload and post shared content such as images, video, audio, and other types of content, receive various forms of data, and/or perform socially-related functions. For example, the network service can allow a user to send messages to particular or multiple other users, form social links in the form of associations to other users within the network service, group other users in user lists, friends lists, or other user groups, post or send content including text, images, video sequences, audio sequences or recordings, or other types of content for access by designated sets of users of the network service, participate in live video, audio, and/or text chat with other users of the service, etc. In some implementations, a "user" can include one or more programs or virtual entities, as well as persons that interface with the system or network.

A user interface can enable display of images, video data, and other content as well as communications, privacy settings, notifications, and other data on a client device 120, 122, 124, and 126 (or alternatively on server system 102). Such an interface can be displayed using software on the client device, software on the server device, and/or a combination of client software and server software executing on server device 104, e.g., application software or client software in communication with server system 102. The user interface can be displayed by a display device of a client device or server device, such as a display screen, projector, etc. In some implementations, application programs running on a server system can communicate with a client device to receive user input at the client device and to output data such as visual data, audio data, etc. at the client device.

In some implementations, server system 102 and/or one or more client devices 120-126 can provide a display application. The display application may allow a device to display various data, e.g., map and location data, location notifications, etc. The display application can provide an associated user interface that is displayed on a display device associated with the server system or client device. The user interface may provide various display functions (e.g., display modes) for designated images and other functions.

Other implementations of features described herein can use any type of system and/or service. For example, photo collection services or other networked services (e.g., connected to the Internet) can be used instead of or in addition to a social networking service. Any type of electronic device can make use of features described herein. Some implementations can provide features described herein on client or server devices disconnected from or intermittently connected to computer networks. In some examples, a client device including or connected to a display device can process and display data stored on storage devices local to the client device (e.g., not connected via a communication network) and can provide features and results as described herein that are viewable to a user.

Figure 2:
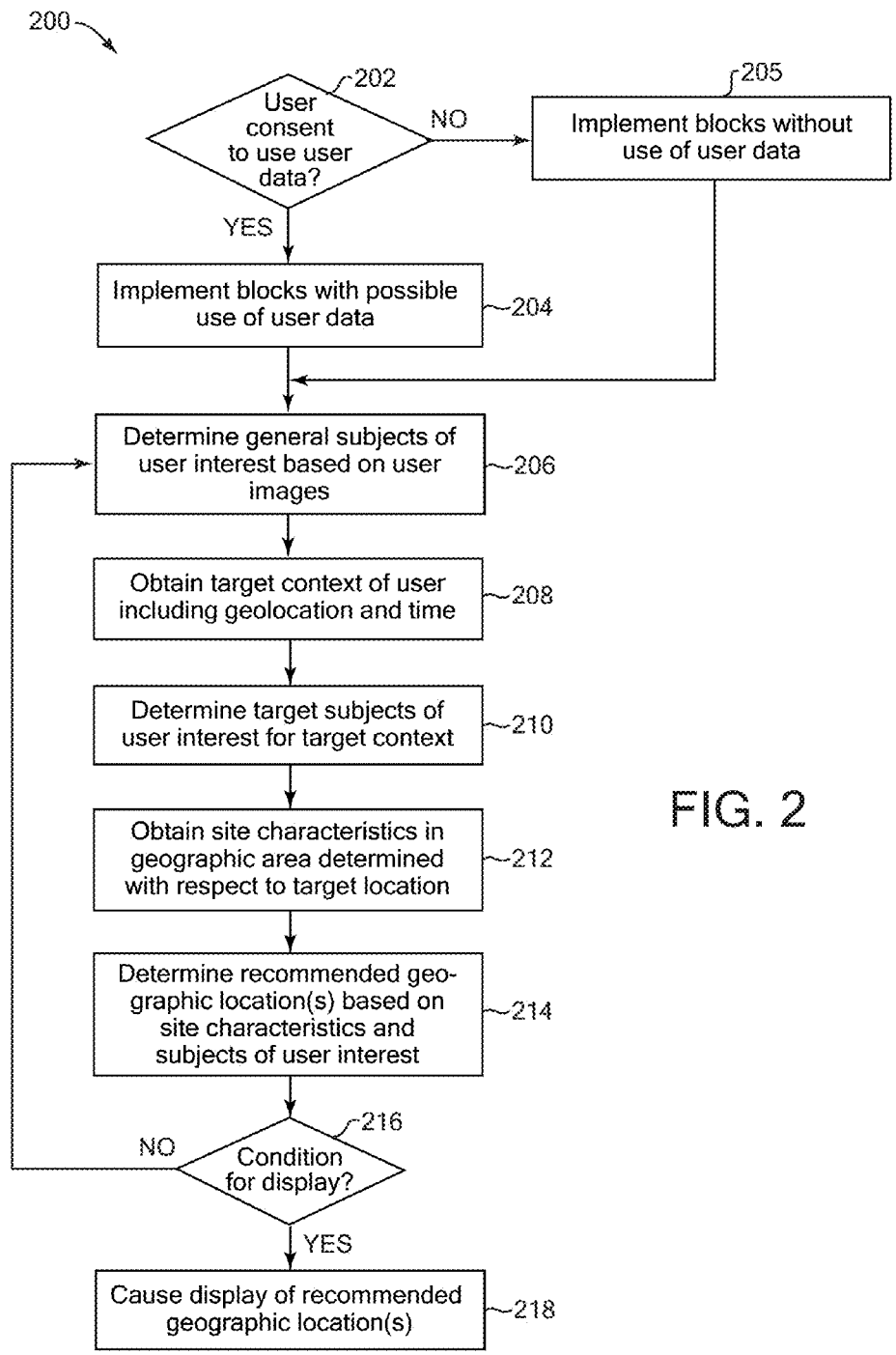
FIG. 2 is a flow diagram illustrating an example method to provide geographic locations and other associated information related to user interests, according to some implementations.

FIG. 2 is a flow diagram illustrating one example of a method 200 for providing geographic locations and other associated information related to user interests. In some implementations, method 200 can be implemented, for example, on a server system 102 as shown in FIG. 1. In other implementations, some or all of the method 200 can be implemented on a system such as one or more client devices 120, 122, 124, or 126 as shown in FIG. 1, and/or on both a server system and a client system. In described examples, the implementing system includes one or more processors or processing circuitry, and one or more storage devices such as a database 106 or other storage. In some implementations, different components of one or more servers and/or clients can perform different blocks or other parts of the method 200.

An image as described herein can be a digital image composed of multiple pixels, for example. An image as described herein can be stored on one or more storage devices of the implementing system or otherwise accessible to the system, such as a connected storage device, e.g., a local storage device and/or storage device connected over a network. In various implementations, images can be obtained from a variety of sources. For a particular user, images may be obtained from uploads by a user to a server over one or more networks, from an album or other stored collection of multiple images owned or accessible by a user, etc.

In block 202, it is checked whether user consent (e.g., user permission) has been obtained to use user data in the implementation of method 200. For example, user data can include user preferences, user biometric information, user characteristics (identity, name, age, gender, profession, etc.), information about a user's social network and contacts, social and other types of actions and activities, content, ratings, and opinions created or submitted by a user, a user's current location, historical user data, etc. One or more blocks of the methods described herein may use such user data in some implementations. If user consent has been obtained from the relevant users for which user data may be used in the method 200, then in block 204, it is determined that the blocks of the methods herein can be implemented with possible use of user data as described for those blocks, and the method continues to block 206. If user consent has not been obtained, it is determined in block 205 that blocks are to be implemented without use of user data, and the method continues to block 206. In some implementations, if user consent has not been obtained, the remainder of method 200 is not performed.

In block 206, general subjects of user interest can be determined based on a collection of user images. This block can be performed in some implementations in which general subjects of interest are used in a determination of recommended geographic locations for a user. In some implementations, general subjects of interest are not determined and used, and block 206 can be omitted or its features provided within other blocks described herein.

The user images can be digital images composed of multiple pixels, for example, and can be stored on one or more storage devices of the system or otherwise accessible to the system, e.g., a connected storage device such as a local storage device, storage device connected to or in communication with a network accessible to the system, etc. For example, the images can include photos captured by a camera, one or more videos each including a sequence of multiple images, one or more image frames extracted from a video stream or other video data, or images derived from other sources. For example, some implementations can obtain individual frames in video data as one or more of the user images of the collection. To reduce processing, some implementations can sample a subset of the frames of a video, e.g., a portion of video, key frames or representative frames, every Nth frame of a video, etc., can be selected for processing.

The collection of user images can be images associated with a user, e.g., provided or submitted by a user to be stored at a server and/or network service, accessible by the user over a network, etc. Obtaining of user images from a user's collection is performed with the user's consent as indicated in block 204, e.g., via stored user preferences accessed by block 206. The collection (or portion thereof) can be locally stored and accessible by the system performing method 200, and/or can be remotely stored on one or more servers or client devices, e.g., as one or more albums provided in account(s) of user(s) of one or more network services.

The general subjects of user interest can be determined based on one or more characteristics of the user images in the collection. In some implementations, the characteristics can include content depicted in the image, e.g., content including image features, topics related to the image features, categories in which the image features are included, etc. For example, the image content can include features including persons, objects (e.g., vehicle, articles, monuments, etc.), landscape features (e.g., sky, mountains, cliffs, trees, buildings, etc.), and/or any other content. In some implementations, the content is described using descriptors (e.g., labels) associated with the image. In some implementations, the labels can be determined for the images based on image recognition techniques implemented by one or more systems with user consent, can include manually-input descriptions based on user input, etc. Some implementations can assign categories, synonyms, and/or related topics to labels based on databases and/or knowledge bases and graph databases that store and provide associations and relationships of categories and topics to words and phrases. For example, an image feature labeled as "apple" can also be labeled as "fruit," "food," etc., based on stored relationships to categories and words. Some implementations can use metadata and/or other data associated with user images (e.g., audio data associated with an image or video) to determine the general subjects of user interest.

Some examples of determining subjects of interest, including general subjects, of interest to the user are described below with respect to FIG. 3. In some implementations, the method 200 can use general subjects of interest to the user in the determination of target subjects of interest and/or in determining geographical locations of interest as described below.

In some implementations, determination of general subjects of interest of block 206 can be performed as pre-processing, e.g., before performing other blocks of method 200 (e.g., blocks 208-218). For example, the general subjects of interest can be determined based on the user's collection of images at a particular point in time before obtaining a target context (e.g., geographic location) of the user in block 208. In some implementations, block 206 can be performed multiple times, e.g., periodically and/or based on one or more conditions occurring. Some examples of such conditions can include the user submitting (e.g., uploading) a particular number of new images to the user's collection storage, which causes an update to the general subjects of interest determined based on that user collection. In some cases or implementations, block 206 can be partially or completely performed simultaneously or after one or more other blocks in method 200. In some examples, the general subjects of interest can be determined in block 206 concurrently or after obtaining the target context of the user in block 210, e.g., concurrently with determining target subjects of interest in block 210.

In block 208, a target context of the user is obtained, if allowed by consent of the user. In some examples, the target context can include a geographic location (e.g., target location) and/or time (e.g., target time) associated with the user. The target context can be used to determine one or more geographic locations of interest to a user who is considered to have the target context, e.g., in current circumstances, or in a designated or desired situation. In some examples, the target context can include the current location of a user as determined by sensors (e.g., GPS sensors) on a device carried by the user, and the current time of performing block 208. In another example, the target context can include a designated (e.g., projected) location that may be different from the user's current location, e.g., a location intended for travel on a trip. Similarly, the target context can include a designated time, e.g., a different time of day than the current time or a date in the future. In some examples, the target location and/or time can be obtained based on input from a user, e.g., specifying the location and time (e.g., selections from a menu or map, text input, etc.).

In some implementations, the target context can include other user characteristics in addition to or instead of geographic location and time (if user consent is obtained to examine or determine such other user characteristics). For example, a target context can include an indication or description of user status, such as a category of target location or user status (e.g., a home location or "at home," work location or "at work", vacation location or "on vacation," etc.) which the user can input or select via user input or which can be determined by the system based on stored and available user data (if consent has been obtained from the user), e.g., a user calendar, a current user location and/or history of user locations, a user's travel itinerary, etc.). In some implementations, target context can include and specify an activity of the user (which can be considered a user status in some implementations). Activities can include capturing photos, attending an event or presentation, e.g., where the type of event or presentation is specified (e.g., sporting event, music concert, movie, picnic, wedding, other social event, etc.), traveling (and a mode of transportation, e.g., car, bus, bicycle, train, walking, etc.), performing an activity (e.g., playing a sports game or other type of game, shopping, hobbies, arts, crafts, maintenance or repair activities, etc.). Such activities can be input by the user, and/or can be determined by the system based on stored and available user data (if consent has been obtained from the user), e.g., a user calendar and to-do list, a current user location and/or history of locations visited by the user, the time of the activity, messages sent by the user, etc. and cross-referenced with a database of activities and associated locations, times, keywords, etc., and/or machine learning techniques for determining activities based on training data including locations, times, etc.). For example, a target user status and/or activity of the target context can be a current user status and/or activity or can be a designated (e.g., projected) user status or activity that is not currently active or performed by the user.

In block 210, one or more target subjects of user interest can be determined (e.g., estimated) for the target context obtained in block 208. In some implementations, the target subjects of user interest are determined with respect to, and are relevant to, the target context of block 208, in contrast to the general subjects of user interest obtained in block 206 without consideration of the target context of the user of block 208. The target subjects of user interest can be determined by examining the collection of user images associated with the user and finding image characteristics that indicate a user interest. In some implementations, the image characteristics that indicate a user interest are distinctive image characteristics.

In some examples, the content of the user images can be examined. For example, labels (descriptors) associated with the images can be examined, which may have been previously determined for the images and describe the content depicted in the images. In some implementations, the most commonly occurring content (e.g., labels) in the user images can be determined, which can indicate subjects of user interest. In addition, content (e.g., labels) of the user images can be compared to content (e.g., labels) of a larger population of images of multiple users to determine distinctive content that is of interest to the user, if user consent has been obtained from the relevant users. Some implementations can use metadata and/or other data associated with user images (e.g., audio data associated with an image or video) to determine the subjects of user interest. Some examples of determining subjects of user interest are described in greater detail below with respect to FIG. 3.

In some implementations, one or more specific user interests can be specified, e.g., designated or selected by the user, which is used in the determination of subjects of user interest in block 204 and/or block 210. This selection can cause the method 200 to provide subjects of user interest that are specifically related to a specified user interest. For example, a user interest can be designated or selected by the user to be photography, e.g., capturing photos having subjects of interest depicted as content in the photos. For example, photographic subjects of user interest can be types of scenery, objects, or other features associated with locations which have been determined to be interesting to the user to capture as content depicted in photos. In some implementations, a user interest can be specified to be other particular user interests or more general interests. For example, specified user interests can include attending or participating in particular types of events, eating, socializing, etc. Each specific user interest that can be specified for the method 300 can be pre-associated with particular subjects that are designated to fall within that interest, and such subjects can be stored as descriptors, e.g., text or graphical labels, that can be searched for and found in user images to determine subjects of user interest in block 210. Such subjects associated with an interest can also be updated over time based on user actions, e.g., selections by the user of content while engaged in an activity related to the interest.

Some implementations can determine, store, and use a user interest model, if user consent for determining and using such a model has been obtained. The user model may have been created and updated by the system based on previous performances of method 200 and/or based on other user input, behavior, and actions using a user device. For example, the user interest model can provide relationships between a particular user context and subjects of user interest related to that context, and can be used to determine which subjects of user interest are relevant to a target context (without determining identities of persons in images or other user data). In some implementations, the model can be updated when determining subjects of user interest, as described below with reference to FIG. 3, and/or based on user selections and actions (e.g., which recommended locations the user actually travels to).

In some implementations, other subjects can alternatively or additionally be determined in block 206, block 210, and/or method 200. For example, subjects that have been determined to not be of interest to the user can be determined in the user images. In some examples, the subjects not of user interest can be compared to image characteristics, e.g., so that geographic locations related to those subjects can be omitted or filtered from presentation to the user.

In block 212, site characteristics are obtained of one or more geographic areas determined with respect to the geographic user location specified in the target context (e.g., the target location or "target context location"). In some examples, the geographic area can include or be an area surrounding or near the target context location. For example, the geographic area can be an area located within a particular radius around the target context location, e.g., within one mile or kilometer, 10 miles or kilometers, or a user-specified radius. In some implementations, the geographic area may include multiple locations defined as cells or other portions, e.g., if a region surrounding the user location has been divided into such cells. A number of such cells can be selected as the geographic area to provide site characteristics, or each such cell can be considered a geographic area. Regular or irregular shapes of geographic areas can be used in some implementations.

Some implementations can determine the size and/or shape of the geographic area(s) based on the target context of the user. For example, if the target context includes a user location in a constrained area such as an island, then the geographic area need not extend beyond the area. A user status included in a target context can also be used to determine the geographic area. For example, if the target context includes a particular user status that the user is on vacation, then a larger total geographic area can be used to provide site characteristics, e.g., such that the user can be provided with recommended geographic locations at a larger scale relevant to a vacation. This can be in contrast to a smaller total geographic area that can be used for a context including a user activity such as going to a restaurant after work in a home city of the user, where, for example, recommended geographic locations may only need to be nearby locations such as local dessert restaurants, movie theatres, etc. In another example, a user status indicating the user's mode of transportation can indicate which areas should be included in the geographic area. For example, a mode of transportation such as a car can be associated with a large geographic area given the traveling range of the car, as opposed to a bicycle (providing a smaller geographic area) or a train (providing a geographic area concentrated closer to known train stations). In another example, a mode of transportation such as an airplane can be associated with a particular geographic area along a flight route of the plane (e.g., in view of a passenger on the plane), where the device determines the geographic area based on information describing the flight route of the plane. For example, the device can determine geographic locations of interest to the user along the flight route (e.g., in block 214 below) and can output an itinerary describing the geographic locations visible at associated times during the plane flight (e.g., in block 218 below).

The site characteristics obtained in the geographic area indicate or characterize particular locations within the geographic area. Site characteristics can include descriptors (e.g., labels) indicating sights, activities, objects, or other features of particular location within the geographic area. For example, a site characteristic can be "animals" for a location of a zoo or aquarium, as well as the terms "zoo" or "aquarium." A site characteristic can be "playground" and "field" for parks. More specific site characteristics can include proper names or type names of locations, parks, buildings and businesses, roads, other location features, etc. Some implementations can organize or group the site characteristics into different clusters or buckets representing different particular geographic locations.

In some implementations, site characteristics can also include (or be associated with) one or more particular times. A site characteristic time may indicate, for example, that the associated location provides an associated site characteristic label at the particular time. A site characteristic time may indicate that the location or an associated site characteristic label is best experienced at the particular time. Some locations and/or site characteristic descriptors may be associated with a time period, range, or duration, e.g., indicating hours of operation or availability of a business or event at the location (for example, a farmer's market, street faire, restaurant, store, etc.), and/or indicating that the location is best experienced at the specified time period and/or for the specified time duration. For example, a site characteristic label of "sunset" can be associated with a particular time or time period near the end of a daylight period of a day, indicating a time of day at which a sunset is best viewed at the location. A particular site characteristic of "zoo" can be associated with a time period of a day in which the zoo is open to public visitors.

Site characteristics can be determined using a variety of techniques. In some examples, site characteristics can be determined from images that were captured at the locations in the geographic area by multiple users. For example, the most common and/or distinctive content captured in a particular location (e.g., as described by image labels) can be used to represent or characterize that location. Some examples of determining site characteristics are described below with respect to FIG. 4.

In some implementations, site characteristics can be obtained from geographic areas that are further from and/or unrelated to the target context. For example, it may be desired to determine geographic locations that are relevant to the user's general subjects of interest in a much larger geographic area, or in specific geographic areas designated by received user input.

In block 214, one or more recommended geographic locations (and related information, e.g., times) for the user are determined based on the site characteristics and subjects of user interest. These recommended geographic locations and information are potentially of interest to the user based on the user's collection of images. For example, these geographic locations have one or more site characteristics that are similar to one or more subjects of interest to the user.

In some examples, the site characteristics of locations determined to be within the geographic area, as determined in block 212, can be compared to the subjects of user interest determined in block 206 and/or block 210. In some implementations, matches between the site characteristics and the subjects can be determined, and the locations having the matched site characteristics are considered recommended geographic locations for the user. In some implementations, matches can be determined based on similarity between site characteristics and subjects of interest of the user to determine recommended geographic locations. For example, similarity can include exact matches of labels associated with subjects of interest and site characteristics. Similarity can also include semantic similarity determined between labels representing the site characteristics and the subjects of interest. In some implementations, word roots and variations, synonyms, categories, and topics related (e.g., semantically similar) to subjects of user interest can be compared to word roots and variations, synonyms, categories and topics related (e.g., semantically similar to) the site characteristics. In one example, a subject of user interest can be "picnics," which also has a stored association with other subject terms including "parks," "grass," "food," "eating," etc., which have been designated as semantically similar or otherwise related to typical locations and activities performed at picnic events. Such semantic similarities can be determined in databases, dictionaries, thesaurus, knowledge bases, etc. In some implementations, subjects of user interest may have been clustered or binned into groups having one or more associated labels or categories, and these group labels and categories can be compared to labels or categories associated with site characteristics based on images captured by users in locations of the geographic area. In some examples, block 214 can check for site characteristics that are included in one or more categories that are similar (e.g., exact matches or semantically similar) to categories in which the one or more subjects of interest are classified or included, to find site characteristics relevant to the subjects of interest.

In some implementations, site characteristics (or related data of site characteristics) can be compared with the target context for similarity to determine recommended geographic locations that are relevant to the target context of the user. For example, if the target context provides a particular time or time range, then the method can search for site characteristics which have an associated time or time range similar to the target context time. In some examples, the target context time may be 10:00 am, and site characteristics having a time within a particular time range of 10:00 am can be considered similar to the target context (e.g., a default time range or time range based on the type of site characteristics, such as a time range relevant to sunsets for a sunset site characteristic or a time range relevant to public accessibility to an event or presentation site characteristic). Some site characteristics may include a time range, e.g., indicating hours of operation of a business. Some site characteristics can be associated with a user status of "on vacation" that can be matched to a target context indicating that the user in on vacation.

In some implementations, a particular subset of the subjects of user interest can be compared to the site characteristics in block 214, where the subset of subjects is selected from the determined subjects based on the target context. For example, a particular subset of subjects can be selected based on a target context indicating that the user is "on vacation" or "travelling", e.g., not at work, at home, or doing routine activities. Such subjects of interest may have been designated as more appropriate when the user has a status of being on vacation, for example, rather than when the user is located at work or home location or performing routine errands near a work or home. In additional examples, determined subjects of interest have been associated with one or more categories, and the target context has been associated with one or more categories based on, e.g., the geographic location and the time of the target context. The selected subset of the subjects of interest can be associated with one or more categories matching at least one of the categories of the target context.

The locations of those site characteristics that have been compared and determined to be similar to one or more subjects of interest can qualify to be recommended geographic locations for the user. In some implementations, the determined geographic locations can be assigned scores determined based on one or more criteria, and the recommended locations can be ranked according to the scores. For example, the criteria can include the distance of the location to the target user location, e.g., where a closer distance scores higher. The criteria can include a determined degree of interest to the user, where a greater degree of interest provides a better score. For example, the degree of interest to the user can be based on how many site characteristics matched or were similar to subjects of interest to the user, and a greater number of such matches or similarities provides a better score. The degree of interest can be based on whether the location has a similar characteristic to the most common label (subject) in the user's image collection, indicating a strong degree of interest. The criteria can include time-based considerations. For example, locations having a limited time range in which they are of interest can score higher than locations having no such limitations, due to the more limited availability of the limited time locations. Locations having a time at which they are of interest that is a longer time in the future than a different location can have a worse score than the different location. In some implementations, a particular location can be scored separately and individually for each of multiple different time ranges, e.g., for different times of day, months, seasons, etc. For example, a particular geographic location at different times can be considered different locations. Some implementations can combine multiple such criteria to determine a total score based on the individual criteria scores, and rank the locations based on the total score.

In block 216, it is checked whether a condition has occurred to cause display of one or more recommended geographic locations for the user, e.g., the display provided by a device used by the user. A display condition can be any of a variety of conditions in various implementations. For example, some implementations can receive user input requesting the display of the geographic locations. In some examples, this user input can be a request to provide the geographic locations as relevant to a current target context of the user, e.g., a current geographic location of the user and the current time. In another example, the user input can be a request to provide the geographic locations for a designated context, e.g., a designated location and time at which the user will be traveling at the designated location. In another example, a planned trip for the future can include multiple locations in a trip itinerary, and the user can input a request to display (or a device can automatically display, without user intervention) recommended geographic location(s) for the user at one or more of the multiple locations of the trip.

Some implementations can provide the display of the geographic locations automatically based on predefined stored conditions, e.g., stored default or user-input preferences, or other settings. For example, stored settings may indicate to determine and display the one or more geographic locations periodically (e.g., every day, week, or month) or if the user is determined to be performing particular actions (e.g., travelling or on vacation) or is at particular locations and/or has other user states (e.g., at a particular time of day, etc.). For example, a stored user preference may indicate to display the recommended geographic locations if the user is located outside a home city (or defined home geographical area) of the user as detected by the user's device having geographic sensing.

If no condition has occurred for display of the geographic locations, then the method can return to block 206 to determine general subjects of user interest, or can return to other blocks in the method as based on user input. If in block 216 a condition is detected to have occurred to cause the display, then in block 218 output is caused by the user device, where the output indicates one or more of the geographic locations determined in block 214 as recommended locations for the user. For example, in some implementations, the output can include a graphical display of a map that highlights the recommended geographic locations for the user. In some implementations, determined times or time periods at the displayed locations are also displayed in the output. In some examples, the output can include a list or other formatted display of the locations as text, e.g., names, address, global or other type of coordinates, and/or other information describing the location. Some implementations can output activity information, sample or representative images depicting the locations, and other information associated with the recommended geographic locations. In some implementations, the recommendation locations can be displayed in a ranked order, where highest ranked locations (e.g., best scoring locations) are output first or at a top of a list, followed by display of locations with lower and/or descending ranks. Other display configurations can also be provided. Various display configurations can be presented based on user input, some examples of which are described with reference to FIGS. 7 and 8. Some implementations can also display geographic locations that are not relevant to determined subjects of interest, e.g., in addition to output of geographic locations determined using techniques described herein.

Some implementations can receive user feedback indicating which output recommended locations were most liked or approved by the user. For example, the user can directly provide such input in response to a displayed prompt. In some implementations, if user consent has been obtained, a system can track the user's actions with respect to recommended geographic locations and provide updates to the determination of subjects of user interest and geographic locations. For example, if a user travels to one of several recommended locations with a particular time period after the recommendation is output, the user's interest in the characteristics of that traveled-to location can be emphasized or weighted higher in future location recommendations.

Figure 3:
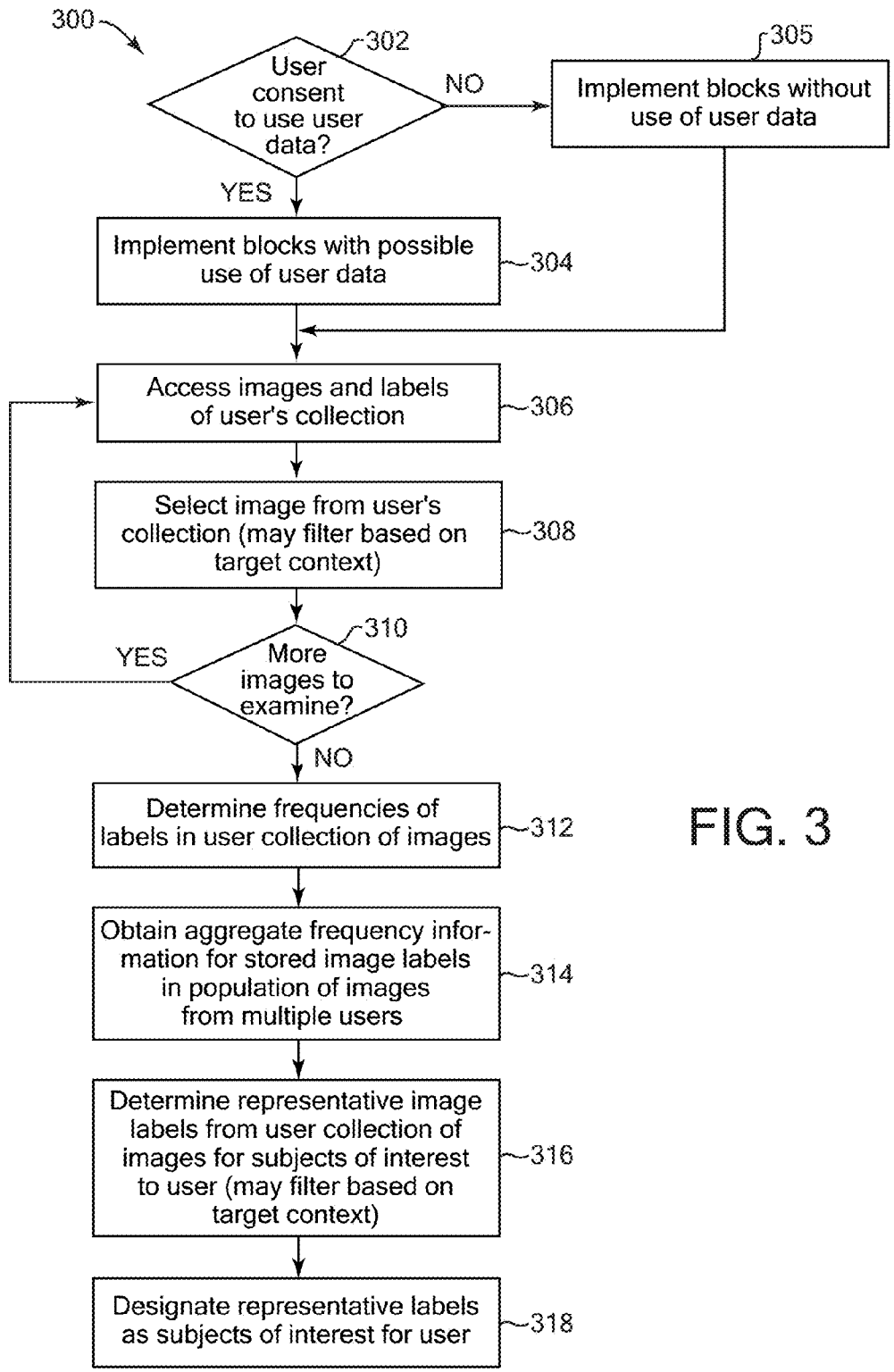
FIG. 3 is a flow diagram illustrating an example method to determine subjects of user interest based on user images, according to some implementations.

FIG. 3 is a flow diagram illustrating an example method 300 to determine subjects of user interest based on user images. For example, method 300 can be used for block 206 and/or block 210 of FIG. 2. Other methods can alternatively be used for block 206 and/or 210.

In block 302, it is checked whether user consent has been obtained to use user data in the implementation of method 300. For example, user data can include data as described above for FIG. 2. One or more blocks of the methods described herein may use user data in some implementations. If user consent has been obtained from the relevant users for which user data may be used in the method 300, then in block 304, it is determined that the blocks of the methods herein can be implemented with possible use of user data as described for those blocks, and the method continues to block 306. If user consent has not been obtained, it is determined in block 305 that blocks are to be implemented without use of user data, and the method continues to block 306. In some implementations, if user consent has not been obtained, the remainder of method 300 is not performed.

In block 306, images and labels of the user's collection of images are access, if user consent has been obtained. As described above, the user's collection of images can be stored on one or more storage devices. The access to the user's images also can include access to stored labels (descriptors) that are associated with the images. For example, labels associated with an image can be stored as metadata or otherwise in association with their associated image. A label can describe one or more characteristics of its associated image, including the content depicted in the associated image (e.g., types of content, generic names for content, specific names for content, etc.). In some examples, labels can include "sky", "cloud," "trees," "persons," and "car" if these types of content are depicted in the associated image.

The labels may have been determined by method 300, received from another process or device, provided by the user, and/or provided by another source. In some implementations, block 306 can include determining one or more labels for the selected image. For example, image label generation techniques can be used (if user consent has been obtained), including performing image recognition techniques to analyze image pixels and detect different types of content in an image. In some implementations, a machine learning model can be used that has been trained to detect objects and other image features. For example, the machine learning model can be trained with labeled training images (e.g., manually labeled) relative to a reference taxonomy to detect various types of objects and use the training to automatically determine labels in new images. Some image labeling examples are used in the Automatic Linguistic Indexing of Pictures (ALIPR) techniques. Specific identities of persons are not determined.

Images can also be associated with other metadata stored in association with the images. Other metadata can indicate various characteristics of the image, including characteristics of a camera that captured the image, e.g., EXIF data. Metadata can indicate the time of capture of the image, and/or the geographical location where the image was captured (e.g., coordinates or other identification of location). In some implementations, a location of image capture can be determined or estimated after image capture based on identified objects in an image. For example, if a depiction of the Eiffel Tower is recognized in an image, an estimated location of image capture can be surmised based on that recognized object and the angle of view of that object in the image. Metadata can indicate other image characteristics, e.g., user status at the time of image capture (e.g., at home, on vacation, etc.), etc. Such metadata can be provided by the user and/or automatically provided by a system based on examination of user data, if user consent has been obtained.

Images can also be associated with other data. For example, audio data may be associated with a single still image or multiple images (e.g., as a soundtrack for a video). In some implementations, descriptive labels similar to those described above can be associated with an image based on examining the associated audio data (if user consent is obtained to do so). For example, an analysis of audio data associated with a video can indicate that cars are driving by on a road (even if no road is visible in the video), such that a "road" label can be associated with the video.

In block 304, an image from the user's collection of images is selected to be examined for the determination of subjects of interest to the user. In some implementations, any image from the user's collection is selected. For example, if general subjects of user interest are being obtained as in block 206 of FIG. 2, then all accessible user images can be processed, and the selected image can be any of the available user images.

If target subjects are being determined in method 300 which relate to a target context determined for the user as in block 210 of FIG. 2, then in some implementations, the selected user image is selected to be an image that is relevant to the target context, e.g., the user image is filtered so as to be similar in one or more characteristics to the target context. The image label(s) and/or other image metadata can be examined to determine if an image is relevant to the target context.

In some examples, the target context may include a particular time, e.g., the current time of day, a designated time of day, a particular date, etc. The selected user image can be selected based on its capture date (as provided in image metadata) being similar to the target context time of day, e.g., within a particular time range of the target context time of day (e.g., regardless of the date of capture). For example, this allows images to be selected which were captured near in time to the target context time of day so that user interests at the target context time of day are more likely to be determined from those relevant images. In some examples, particular subjects of user interest may be time-limited, e.g., interests in capturing images of a sunset, interests in capturing images having a particular lighting based on time of day and sunlight, interests in activities at a particular venue having limited visitation hours, etc.

Some implementations can select an image that was captured at a location (as indicated in image metadata) having a similar type to the location of the target context (e.g., based on semantic similarity as described above). For example, if the target context location is known to be a restaurant, then an image can be selected that is known to depict a restaurant or one or more persons eating (e.g., based on accessing the labels associated with the selected image), or is known to have been captured in or outside a restaurant (e.g., based on location data of the selected image). A target context location can indicate a particular type of business or place, e.g., a park, grocery store, restaurant, clothing store, gymnasium, etc. Each type of location can be associated with stored characteristics that can be checked if such characteristics are present in the images of the user's collection, and an image having similar characteristics can be selected. For example, a park type of target context location can be associated with labels including "grass," "playground," "dog," etc.

In some implementations, the target context may include a particular user status, such as "on vacation," and this user status can be checked against the user images to select an image that is related to that user status. In some examples, user images can be associated with predefined metadata indicating such user status, where the images can be associated with this metadata based on user input or based on the user's status at the time of capture (e.g., as determined from the current geographic location of the user's device, user calendar information, etc.). In some implementations, more specific user statuses can be assigned to the target context, and an image similar or related to that specific user status can be selected. For example, instead of "travel," a user status can be assigned as work-related travel, vacation-related travel, etc.

In some implementations, an activity may be included in the target context, e.g., "eating," "playing tennis," "travel," etc., and an image that depicts this activity can be selected, e.g., based on labels of the selected image. For example, each target context activity available to be assigned to a target context can be associated with a set of subjects that can be compared to the labels of images in the user's collection to find matching or similar labels. Topic and categories related to types of locations and/or user status can also be checked for similarity (e.g., semantic similarity) to categories and topics related to the target context location, user status, or activity, similarly as described above.

In some implementations, a specified minimum threshold number of images from the user collection can be required to be selected to determine subjects of user interest as described below. For example, fewer images than the minimum threshold may not provide as reliable indications of subjects of interest. In some implementations, if it is determined that there are fewer images than the minimum threshold that qualify for selection (e.g., after iterating block 308 through all of the available images in the user collection), then one or more of the target context characteristics can be ignored in the selection of the image as an additional image. For example, if the target context is a particular time and location, then the time similarity can be ignored so that the minimum number of images can be selected.

Some implementations can examine other image characteristics to determine if an image of the user's collection should be selected. For example, visual characteristics including blurriness, brightness, and color noise can be detected in an image, and if any of these characteristics do not satisfy a particular associated threshold, then the image can be rejected.

In some implementations, the selection of the image in block 308 is not filtered based on the similarity of image characteristics to the target context as described above, such that any image of the user's collection is selected. However, the similarity of the selected image to the target context can be used to assign a weight or score to a selected image. In one example, the stronger the relatedness (e.g., similarity) to the target context, the greater the weight assigned to the selected image. In one example, if the selected image was captured at a similar time of day as the target context time, and the selected image has a label indicating it was captured on vacation and the target context includes that status, then a higher weight can be assigned to that selected image than to other selected images that have fewer similarities to characteristics of the target context.

In some implementations, a specific user interest is determining the subjects of interest, then an image depicting only features unrelated to the specific user interest may not be selected. For example, if the user's specific interest in photography is determining the subjects of interest, then images depicting objects such as a barcode, a receipt describing a purchase from a seller, or other utilitarian information are not relevant to photographic interests and those images would not be selected. However, if the user's interests in purchases or related activities are determining the subjects of interest, then images depicting such objects can be selected.

In some implementations, one or more of the labels of a selected image can be designated to be ignored by method 300 (e.g., discarded for purposes of method 300). For example, particular types of labels associated with the image can be ignored, or can be ignored based on a specific user interest. In some implementations, labels that are not relevant to determining a particular subject of interest can be ignored, or which are not related to a target context as described above. In some implementations, ignoring of particular labels can be performed at other stages of method 300, e.g., block 312 or 316.

In block 310, it is checked whether there are additional images to examine. If so, the method returns to block 306 to select another image from the user's collection of images. If no additional images are to be examined (e.g., if they have all been examined for possible selection), then block 312 is performed.

In block 312, frequencies of particular image labels are determined in the user's collection of images (and/or for selected subset(s) of that collection of images). For example, each particular label can be counted in the collection of images and compared to the total number of images to determine a frequency (e.g., percentage or ratio of the number of images for which the label appears to the number of labeled images in the collection). In some implementations, labels can first be clustered into groups based on their semantic similarity or other relatedness (e.g., category and member), and the frequency of each label group can be determined. In some implementations, each image can be counted only once for each group in the frequency determination, regardless of the number of labels in a group that are associated with a single image. For example, labels of "car" and "hatchback" can both be assigned to a car group having a "car" group label, and an image that is associated with both these labels can be counted as a single occurrence of the car group label.

In block 314, aggregate frequency information is accessed for stored image labels that are associated with a population of images provided by multiple users, if consent has been obtained from the users whose images are processed to provide the frequency information. The aggregate frequency information describes the frequencies of occurrence of image labels in the population of images that includes multiple user collections. The aggregate frequency information is anonymized so that the contents of any particular user's image collection are not known by the system implementing method 300. For example, user devices used by the other users can determine frequency information of user image labels locally to the user device and submit the frequency information to a server. Alternatively, the server can determine such frequency information from accessible stored user images, e.g., stored by one or more servers, a network service, etc. The server aggregates label frequency information from the population of multiple different users' images to determine an average frequency of occurrence for each label (or other combinational result of users' frequency information instead of the average). These averaged frequencies of occurrence, determined from a minimum number of users (e.g., 100 or more), can be provided to block 314. Thus, the method 300 need only obtain aggregate frequency information describing image collections of many users and not label frequency information pertaining to individual user collections of images.

In some implementations, the method only accesses the aggregate frequency information for image labels that are similar to the labels of the user's image collection as accessed in block 306. For example, if labels of "car" and "persons" are found for the user's collection of images, then aggregate frequency information relating to those same labels (or labels that are semantically similar to those labels) can be accessed in block 314 without having to access aggregate frequency information for all the other dissimilar labels found in other users' collections.

In block 316, representative image labels are determined from the user's collection of images as representative of subjects of the user's interest. For example, in various implementations, the representative image labels can be the most common and/or distinctive labels in the user's collection of images. In some examples, the image labels are common, e.g., they are the most commonly appearing labels in the collection of images, thus indicating high user interest in this labeled content since the user has captured and collected many images depicting this content. Some implementations can use a minimum threshold such that a label must appear above the minimum threshold number of times to be considered a representative label. Some implementations can also examine times associated with labels, e.g., the most common time periods for particular labels.

In some implementations, the representative labels can be distinctive in the user's collection of images as compared to similar labels in a population of images, e.g., in average user collections. For example, distinctive labels are labels that have a disproportionately high frequency in the user collection of images (e.g., are a high percentage of the labels in the collection) as compared to the frequency of similar labels in the image collections of users in general. Distinctive labels can describe content that indicates a particular subject of interest of the user because these labels indicate particular subjects that are not common or routine subjects in most collections of user images. Some labels are very numerous in images but can be considered not distinctive enough to be considered representative of a user's interest. For example, labels such as "person," "car," "house," "sky," etc. may be very common in the user's collection of images, but are likely to be incidental and not indicate any particular interest of the user. Such labels are typically common and have a high frequency in most users' image collections. In contrast, if more distinctive labels including "playground," "bicycle," "dog," etc. are disproportionately common in the user's collection of images compared to the average user collection, they are more likely to indicate particular user interests in this content, e.g., as photographic subjects or for other user interests.

The distinctive user labels can be found in the user collection of images by comparing each particular label's frequency within the collection to the aggregate (e.g., averaged) frequency of similar labels in the population of images including collections of multiple users. For example, the frequency of labels determined in block 308 can be compared to the aggregate frequency information obtained in block 314 for image labels that are similar to the user's image labels (e.g., where similar labels are the same labels or semantically similar labels, where semantic similarity is as described above). A label of the user's image collection that has a higher frequency than the aggregate frequency for similar labels can be considered distinctive. In some implementations, if that label also meets the minimum threshold for number of appearance in the user's collection, the label can be considered a representative label. The labels of the images accessed in block 306 can be examined and determined if they qualify as representative labels.

In some implementations, a hypergeometric test is performed for each label of the collection of user images with respect to the labels of the multiple users' image collections. This test can provide a confidence score for each label of the user's image collection indicating whether label is overrepresented in the user's collection of images compared to the label's representation in a population of images of multiple users' image collections.

Some implementations can filter or disregard particular labels as part of the processing of block 316. For example, the labels can be examined with regard to the target context and labels that are not relevant to the target context can be discarded. In some implementations, if selection of the images was not performed in block 308 with respect to the target context, then the labels can be examined in block 316 with respect to the target context. Some implementations can perform both image selection in block 308 and representative label determination in block 316 with respect to the target context. In some examples, a previously-stored list of reference labels can be associated with each of particular user contexts (location, time, etc.), and the examined labels from the user's image collection can be compared to that stored list. If an examined label does not match or is not similar to any reference label, then it can be disregarded. In some examples, a target context that includes "on vacation" can cause labels such as "car," "street," "dog," "pet," and other labels to be disregarded due to those labels not matching (e.g., being similar to) any of the stored labels stored in association with a "vacation" user status (e.g., they may be unlikely to be a distinguishing type of content for a vacation status of the user).

Some labels can be disregarded as incidental and not indicating a subject of interest of the user based on the type of content described by the labels and/or based on the type of subjects of interest being determined. For example, if the subjects of interest are for a specific photographic interest of the user and indicate general features the user is interested in photographing, then labels indicating particular persons depicted in an image may be disregarded in some implementations. For example, the purpose of capturing images that depict particular persons may be to photograph and record a memory of those particular persons in particular places, and the purpose of capturing images not depicting those particular persons is more likely to record a memory of the non-human content depicted in the images. The labels for non-human image content may be more likely to reflect a photographic interest of the user.

In block 318, the representative labels determined in block 316 can be designated as subjects of interest for the user. These subjects of interest can be included in the comparison to site characteristics as described above for FIG. 2 to find recommended geographic locations.

In some implementations, if user consent has been obtained, a user interest model can be updated, e.g., in method 300 or other block of the described methods, based on the determination of representative labels in block 316. For example, the user interest model can associate user context information with particular subjects of interest to the user having that context, as determined over multiple iterations of method 300 over time for different target contexts. For example, the method may have determined subjects of interest (representative labels) including particular labels, locations, and times with a user context of eating at a restaurant. These data and associations can be stored in one or more storage devices for access by the model. In other examples, a model can be provided and updated for a user context of a beach, another model for a car trip context, etc., which each model can determine associated subjects of interest. The model can receive an input of a particular target context (e.g., geographic location, time of day, activity, etc.) and determine the user's subjects of interest for that target context as based on previous stored determinations of representative labels from block 316. The model can be updated with new representative labels determined in block 316 that are associated with the target context data determined in block 208 of FIG. 2. The model may be able to be used in future requests of geographical locations by the user based on a particular target context, e.g., if the particular target context matches a stored target context for which the representative labels were previously determined.

Figure 4:
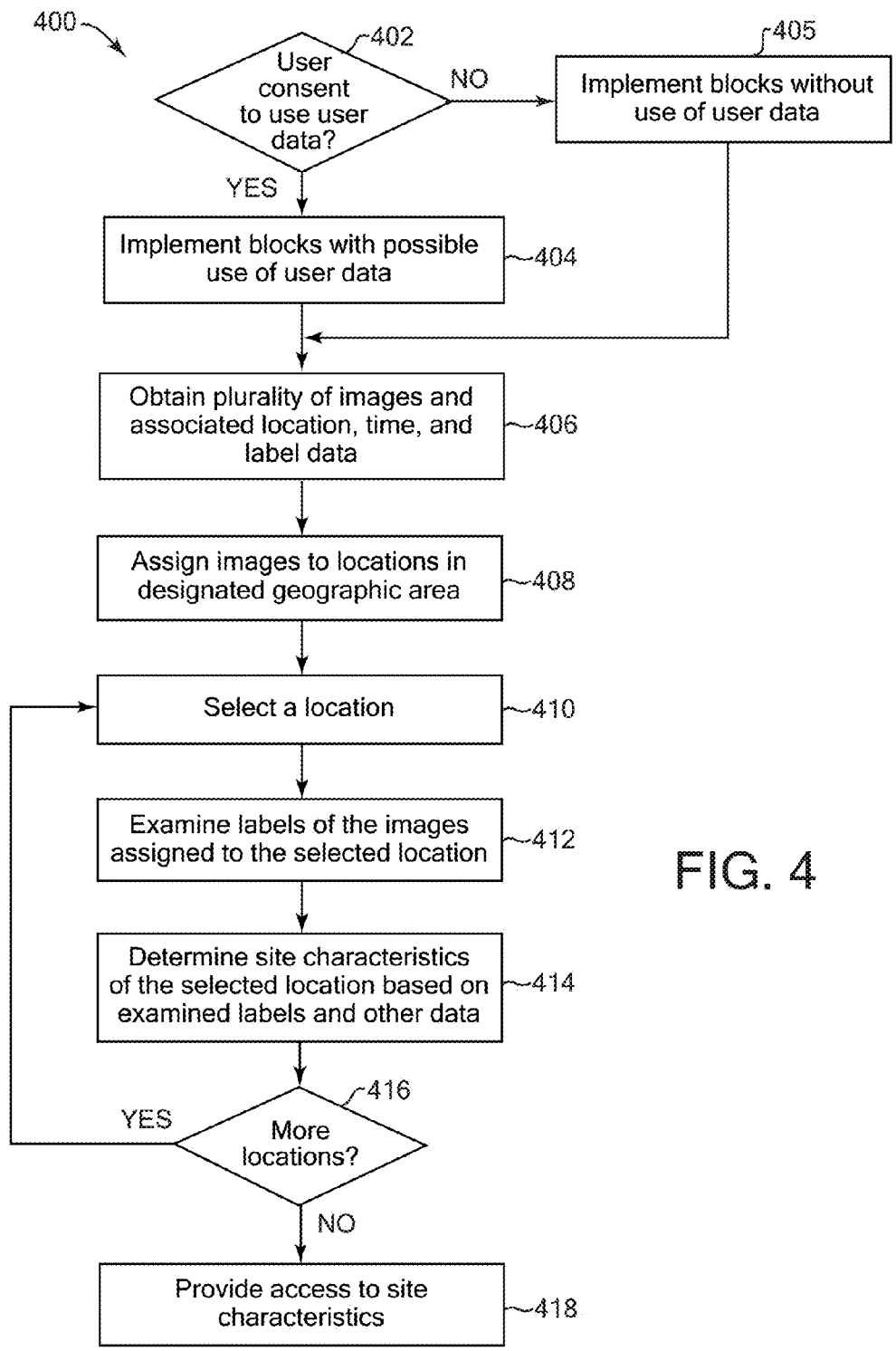
FIG. 4 is a flow diagram illustrating an example method to determine site characteristics of a geographic area, according to some implementations.

FIG. 4 is a flow diagram illustrating an example method 400 to determine site characteristics of a geographic area. For example, method 400 can be used to determine site characteristics in a geographic area with respect to a target location, as provided to block 212 of FIG. 2. In some examples, method 400 can be provided as pre-processing to determine site characteristics such as labels for various locations over different geographic areas. Other methods can alternatively be used to determine site characteristics.

In block 402, it is checked whether user consent (e.g., user permission) has been obtained to use user data in the implementation of method 400. For example, user data can include can include data as described above for FIG. 2. One or more blocks of the methods described herein may use user data in some implementations. If user consent has been obtained from the relevant users for which user data may be used in the method 400, then in block 404, it is determined that the blocks of the methods herein can be implemented with possible use of user data as described for those blocks, and the method continues to block 406. If user consent has not been obtained, it is determined in block 405 that blocks are to be implemented without use of user data, and the method continues to block 406. In some implementations, if user consent has not been obtained, the remainder of method 400 is not performed.

In block 406, a plurality of images and associated location, time, and label data (and other metadata) is obtained. For example, the location, time, and label data can be metadata of the images, where the label data can be descriptors of the content of the images (and/or descriptors of content of data associated with the images, e.g., audio data as described above). This data can be determined similarly as described above for methods 200 and 300. The images can depict any of a variety of scenes, e.g., indoor scenes, outdoor scenes, etc. The images may have been collected from public sources and/or private sources. For example, public sources can include websites, public directories and databases, and other information sources available on the internet. Private sources can include users, e.g., users of client devices 122-126 of FIG. 1, who can upload images to one or more servers, e.g., a server system 102. Images from private sources can be used in the processing of method 400 if user consent is obtained from the users who provided the images, and these images are not made public or provided to any other user or user device.

In block 408, the images obtained in block 406 are assigned to geographic locations in a geographic area based on the location data of the images. In some example implementations the geographic locations can be defined as location cells that each define an individual area in the geographic area. In one example, the geographic area can be divided into a grid of rectangular location cells of the same size, each cell adjacent to other cells. In another example, the location cells are of different sizes. The images that were captured by users within (or are otherwise associated with) a particular location in the area of a particular one of the geographic cells can be associated with that location cell. The labels associated with the images are thus also associated with that location cell. In some cases, features in images which are assigned labels can be present in multiple cells, e.g., if the features cross the borders between cells. For example, if location cells are defined to have a size close to the size of a building, then some features like buildings, lakes, etc. can be present in multiple location cells, and the labels describing these features can be associated with each of these multiple location cells.

In some implementations, the geographic locations (e.g., location cells) can be assigned to times. For example, the locations can be further divided into different time groups or buckets, each time bucket representing a different time range, e.g., a day of the week, an hour of the day, a day of the year, etc. The images captured at a particular location cell are placed in the appropriate time bucket as to when the images were captured (or other associated time of the images), as indicated by the time metadata of the images. In some implementations, if no time data is available (e.g., for an image obtained from a public source), a time of day or time range can be estimated for the image based on the lighting in the image (e.g., if an outdoor area is depicted).

In block 410, one of the geographic locations (e.g., location cells) is selected. In block 412, labels of the selected location are examined based on the label data associated with the images associated with the selected location. For example, if the location cells described above are used, then the labels of all the images associated with the selected location cell can be examined.

In block 414, site characteristics of the selected location are determined based on the labels examined in block 412. For example, site characteristics can include representative labels of the images associated with the selected location. The representative labels can be considered to represent important features of the selected location. In some implementations, the most common labels of the images at the selected location are determined to qualify as representative labels for the site characteristics of the location. For example, these labels can be the labels having the highest frequency (e.g., number) of appearance among the images associated with the selected location. In some implementations, a minimum threshold for number of appearances (frequency) of a label can be used to qualify a label as a representative label.

In some implementations, the most distinctive labels are determined to qualify as representative labels for the site characteristics of the location. For example, aggregate frequency information can be obtained for a geographic region that is larger than the selected location (e.g., larger than the selected location cell). In some examples, the larger region can be two or more times as large as the selected location and can encompass or be located near the selected location. The images captured in this larger region (e.g., by one or more users or other sources) can be examined for labels similar to the labels of the selected location (e.g., the same labels or semantically similar labels). The frequency of appearance of these labels in the larger region can be determined. The frequency of appearance of the labels in the selected location can be compared to the frequency of appearance of similar labels in the larger region. Labels of the selected location that have a higher frequency than the aggregate frequency for similar labels in the larger area can be considered distinctive.

In some implementations, a label qualifies as a representative label (and thus a site characteristic) for the selected location if it is a distinctive label and also a most common label as described above. All of the labels associated with the selected location can be examined and determined if they qualify as site characteristics.

In some implementations, a hypergeometric test is performed for each label of the images associated with the selected location to determine label distinctiveness. The hypergeometric test can provide a confidence score for each label indicating whether the label is overrepresented in the geographic location compared to the label's representation in a set of images captured in (or otherwise associated with) a larger geographic region.

The site characteristics can also be determined based on time buckets defined for the selected location as described above. For example, the most common and/or distinctive labels occurring in each time bucket can be determined as site characteristics for the selected location at the particular time or time range represented by the time bucket. For example, labels can be examined to determine if they are distinctive for a particular time period for the selected location by examining the frequency of appearance of image labels in a particular time bucket of the selected location compared to frequency of similar image labels for a corresponding time bucket for the larger region.

In some implementations, labels can be clustered into larger buckets or categories to provide a more accurate description of the selected location, and/or to avoid over-representation of a particular location attribute that is described by multiple labels. For example, labels that are related, e.g., by meaning, category, theme, etc., can be clustered together to a single representative label for the cluster. In one example, the labels "food" and "picnic" can be clustered together to a "picnic" cluster so as to avoid over-representing the picnic with a greater number of labels. Clustering labels and images into geographic and time buckets can also save processing power and time. For example, large numbers of images and/or labels may be removed from the comparisons to subjects of interest described in FIG. 2.

In some implementations, the site characteristics can also include a particular time that is determined based on the times of image capture of the images associated with the selected location. In some examples, the most common time or time range of the timestamps of the images associated with the selected location can be used as a site characteristic of the selected location, e.g., as an indication of the most popular time at which images are captured and/or activities performed at the location. Similarly, site characteristics can include a particular location within the area covered by the selected location (e.g., particular location within the location cell). The particular location can be the most common location of capture for the images associated with the selected location. Such a particular location may indicate a particular point of interest within the area of the selected location.

In some implementations, the site characteristics determined in block 414 can be used to determine a description for the selected location. For example, the labels determined for the selected location can be used to form descriptions including the scenery at the location, points of interest at the location, activities which have been performed at the location, etc. For example, labels may be provided in various combinations to generate a textual or graphical description. In some implementations, descriptions can be inferred by the system based on site characteristic labels. For example, if labels of "park" and "dog" were determined as site characteristics for the location, then a description of an activity of "walking dogs" can be provided for the location. Graphical descriptions can also be determined, e.g., graphs, histograms, label sizes, or other charts showing frequency of occurrence of particular labels in images captured at the selected location.

In block 416, it is checked whether additional geographic locations are to be processed. If so, the method returns to block 410 to select another geographic location to process to determine site characteristics. If not, then in block 418 access is provided to the determined site characteristics by requesting devices.

It should be noted that the blocks described in the methods disclosed herein can be performed in a different order than shown and/or simultaneously (partially or completely) with other blocks, where appropriate. Some blocks can be performed for one portion of data and later performed again, e.g., for another portion of data. Not all of the described blocks need be performed in various implementations. In some implementations, blocks can be performed multiple times, in a different order, and/or at different times in the methods. In some implementations, the methods can be implemented, for example, on a server system 102 as shown in FIG. 1. In some implementations, one or more client devices can perform one or more blocks instead of or in addition to a server system performing those blocks.

In some implementations, methods described herein can be implemented, for example, on a server system 102 as shown in FIG. 1. In some implementations, some or all of the methods can be implemented on a system such as one or more client devices 120, 122, 124, or 126 as shown in FIG. 1, and/or on both a server system and a client system. In some implementations, different components of one or more servers and/or clients can perform different blocks or other parts of the methods.

FIG. 5 is a diagrammatic illustration of an example table 500 showing example labels found in a user's collection of images and results of processing the labels according to one or more features described herein. In this example, subjects of interest to the user are intended to be found, e.g., as described in method 300 of FIG. 3, so that one or more recommended geographic locations can be provided to the user, e.g., displayed on a user device. In one example, the user's collection of images can include one or more image albums available on accessible user account(s) stored on one or more servers, and/or image albums stored locally to one or more client user devices of the user. The images can be images that were captured by a user using a camera device, images received by the user from other users, devices, or sources, etc.

Table 500 lists a number of labels 502 that have been obtained based on the images of the user's collection (with the user's consent). Labels 502 describe various content that has been detected in the user's images as described above. Table 500 also shows a frequency 504 of the labels 502 in the user's collection of images, e.g., the number of images that were found with the label in the user's collection for which each label 502 describes content. For example, the label "building" is shown to be associated with 96 images in the user's collection, e.g., 96 images were determined to depict one or more buildings and thus were assigned a "building" label. In some implementations, one or more of the labels 502 can be group or cluster labels which were previously formed to include a number of different labels having similar meanings. For example, the "building" label may be a group label that actually includes the labels of "building," "store," "house," etc. In table 500, the labels 502 are arranged in order of decreasing frequency such that the most common labels are listed first and the least common labels are listed last. In some implementations, the labels can be associated with times (not shown) based on the metadata of the user's images indicating, e.g., a time of capture of the images.

In this example, to start the process of finding subjects of user interest based on the labels, the most common labels can be determined. For example, the most common labels shown in FIG. 5 are "people," "sky," "building," and "indoor." However, these labels are not likely to describe specific interests of the user since these types of content appear in many different images and are generic content. Therefore, distinctive labels can also be determined as described above with reference to FIG. 3. In the example table 500, some of the labels 502 are indicated as distinctive labels 506 by designations 508. As described with reference to FIG. 3, in some implementations the system can determine whether a label is a distinctive label by taking the frequency 504 of a label 502 (relative to the total number of images in the user's collection), and comparing that frequency to a frequency of that same or similar label relative to a population of images in multiple users' image collections. In this example, the system has obtained average frequency information for each of the labels 502 in a population of images associated with many other users, e.g., thousands of users whose collections of images (and/or label data) has been analyzed for frequency of labels (with consent of the users). In some implementations, the frequency data and/or user images may be available (if user consent has been obtained) on a network service, e.g., a photo sharing service, social networking service, etc. For example, each of the labels 502 can be matched with a similar label in a frequency database (e.g., implemented on one or more server devices) that stores the frequency information for many labels that have been found in many user's collections.

For example, such a database can be regularly updated with new frequency information as new images are added to the collections of users.

In the example of FIG. 5, particular labels 506 have been found to be distinctive since those labels have a greater frequency in the user's collection than an average frequency of these labels in multiple user image collections. For example, the distinctive labels may have a frequency that is over a threshold amount greater than the average frequency. In some examples, the label "ocean" was found to have a qualifying frequency that was greater than the average frequency for that label. In contrast, labels such as "people," "car," and "picnic" were found to not have a sufficiently greater than average frequency, and so are not considered distinctive. The distinctive labels 506 can be provided as subjects of user interest.

In some implementations, a target context for the user may be available. For example, nearby interesting geographic locations may be desired for display on a user device, and the current context of the user device can be determined. In this example, the user is currently traveling with the user device and is on vacation in a city near water. The user has requested to be recommended one or more geographic locations close to where the user is currently located (e.g., see FIG. 6). The target context can also include a current or specified time for the user.

Table 500 indicates some of the labels 502 that have been found to be relevant to the target context of the user and which are indicated as relevant labels 510 by designations 512. In this example, the distinctive labels have been filtered according to their relevance to the target context. For example, the distinctive labels "ocean," "water," "park," and "grass" have been found to be relevant to the target context, while the other distinctive labels 506 have not been found to be relevant, including "dog," "food," and "sunset." In some examples, the system has determined a target context that included the user being on vacation (e.g., due to the user device being in a location far from the user's home city), and therefore determined that the labels "water" and "park" could be relevant, and removed from consideration such labels as "dog" which are typically not as relevant for images on vacations. Such relevance can be determined by the system, for example, accessing a database in which there is stored a list of labels that are associated with (and thus considered relevant to) a "vacation" status of a user. Labels relevant to many other statuses can be similarly stored. The system also determined that the user is located near an ocean, and so determined the label "ocean" is relevant. The system also determined that the current (target context) time of the user is 2:00 pm and so discarded the label "sunset" as not being applicable to the current time (e.g., the "sunset" label can have a time range associated with it, and the system determines that a sunset at this location will not be seen by the user until that time range occurs, which is currently more than a predetermined threshold time range away from the current time). The system can use the labels 510 that were found to be relevant to the target context as user subjects of interest to determine geographic locations.

Figure 6:
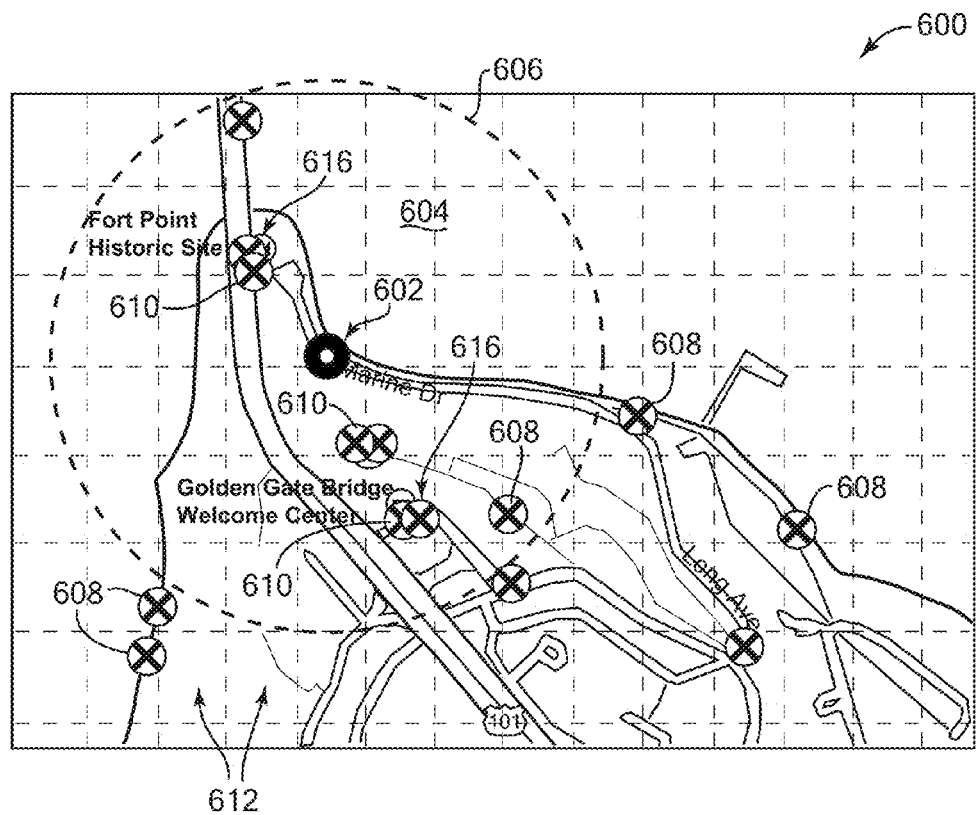
FIG. 6 is a diagrammatic illustration of an example geographic area showing a location of a user and locations at which labels have been assigned, according to some implementations.

FIG. 6 is a diagrammatic illustration of an example geographic area 600 showing a location of a user and locations at which labels have been assigned to characterize those locations. The labels are based on images captured at those locations. In this example, a current location 602 of a user is determined by the system based on GPS sensors of a user device (e.g., client device) carried by the user. To determine nearby geographic locations of potential interest to the user, a system (e.g., user device and/or server system) can determine subjects of user interest as described in the example of FIG. 5. The system can compare the subjects of user interest to site characteristics of locations surrounding the user, as described with reference to FIG. 2.

In this example, a geographic area approximately shown by area 604 is examined that is within a particular radius 606 around the current location of the user. Radius 606 indicates a circular geographic area 604. The geographic area can be other sizes and/or shapes in other cases or implementations. In some implementations, the radius can be adjusted automatically based on the target context of the user, e.g., the current location of the user, time, various user statuses (e.g., a larger geographic area when on vacation than when not on vacation), etc.

The system can access a database to retrieve site characteristics of geographic locations within the geographic area 604. For example, in some implementations as described above, the site characteristics can include labels describing content of images associated with those locations, and/or other data including particular time ranges of interest for the locations. The images can be available from public and/or private sources. For example, the images may be available from public websites or other online sources, and/or may be images that were captured at those locations by various users and available to a system (if user consent has been obtained).

In this example, to provide the database of site characteristics, a system has selected labels from images captured at the locations in the geographic area. FIG. 6 shows examples of locations 608 near the user location 602 which are associated with images, e.g., images were captured at these locations or otherwise refer to these locations. Some locations 610 have a larger number of images associated with them, e.g., are more popular sites for capturing images.

In this example, the geographic area 604 around the user and a larger region surrounding area 604 are defined with location cells 612 that define different locations, such that all the images associated with one location cell 612 are grouped together into a group. The labels of all the images in a particular location cell 612 can be associated with that location cell in the site characteristics database. The labels can also be provided in appropriate time buckets associated with the location cell (e.g., time periods of a day) based on the timestamps of the associated images from which the labels were determined. A set of site characteristics have also been designated for each location cell 612 based on the common and/or distinctive labels associated with that location cell 612. (In some implementations, each location cell can be considered its own geographic area.)

In this example, the system examines each location cell 612 that is at least partially located in the geographic area 604 surrounding the user. At each location cell 612, the site characteristics are received, e.g., the representative labels for images associated with that location cell. As described in examples above, the most common and distinctive labels can be representative labels retrieved as site characteristics, where the distinctive labels have a greater frequency (e.g., number occurring) in their location cell than similar labels in a larger region surrounding or nearby the location cell, e.g., a larger region of multiple cells that encloses the location cell. The site characteristics of each location cell in the geographic area 604 are compared to the subjects of user interest and if a match or similarity is found, the location(s) of the images having the matching labels are designated as recommended geographic locations to be output to the user. For example, the locations 616 were determined in this example to match the subjects of interest of the user and qualify as recommended geographic locations to be output to the user. Using the example subjects of user interest described in FIG. 5, these locations 616 are associated with labels including "ocean," "water," "park," and/or "grass" that match the subjects 512 of user interest determined for the user's current target context. Any times or time ranges associated with these labels and locations may also have been matched, e.g., time ranges between subjects and locations had at least some overlap. The other locations in the geographic area 604 did not qualify for any of a variety of reasons. For example, some these other locations may have had fewer matching site characteristics to the subjects of interest, and/or may not have had enough occurrences of a site characteristic (representative image label) to qualify.

Figure 8:
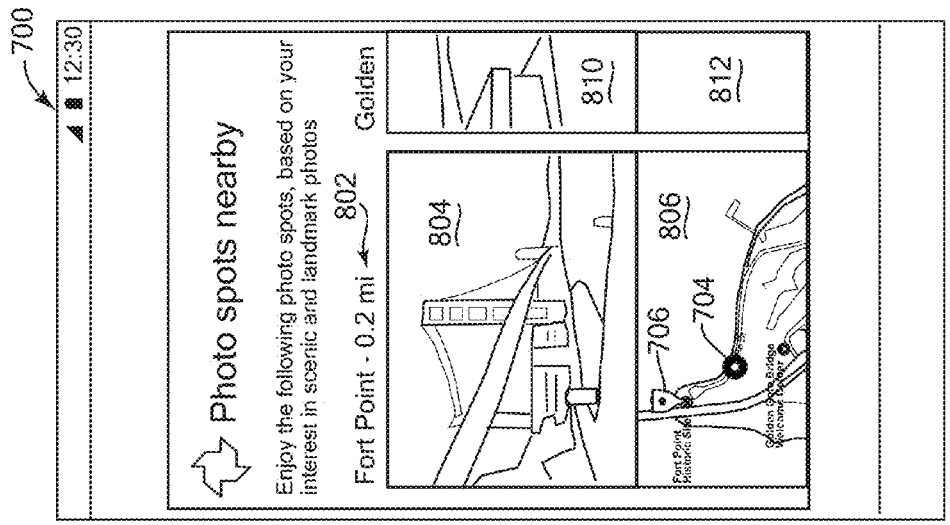
FIGS. 7-8 are diagrammatic illustrations of an example user interface displayed on a display of a device and illustrating one or more described features, according to some implementations.
Figure 7:
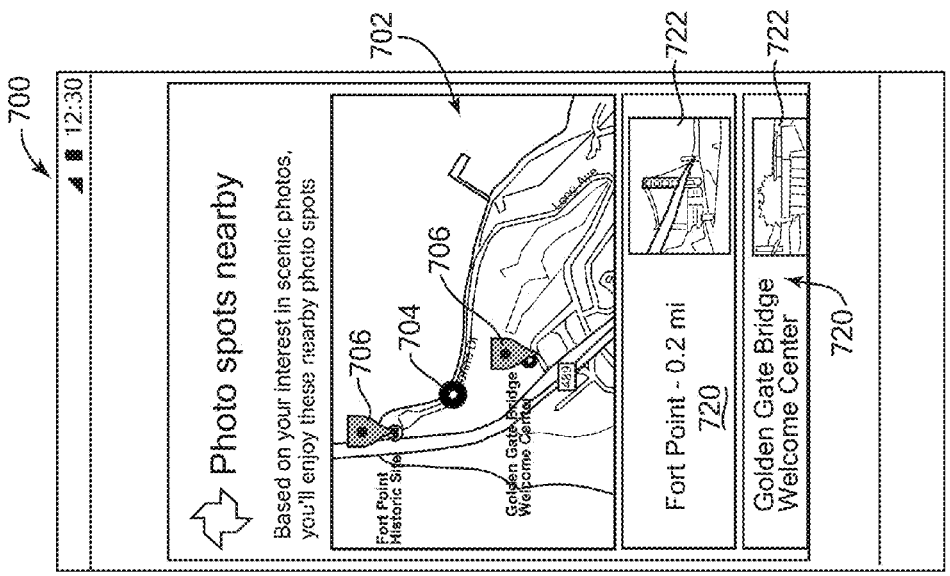

FIGS. 7 and 8 are diagrammatic illustrations of an example user interface 700 displayed on a display of a device and illustrating one or more features described herein. In some example implementations, an application program running on a user device (e.g., client device) can provide the user interface 700 and can display output based on determined data and a user's preferences, commands, and/or other input.

In FIG. 7, user interface 700 displays a number of geographic locations that have been determined to be of interest to the user based on one or more features described herein. In this example, the user has commanded the device to display geographic locations near to a current location of the user that are relevant to the user's photographic interest, e.g., the types of content that the user is interested in capturing in images. In some implementations, the device can automatically (without user intervention) determine to display nearby geographic locations and the user's current context, e.g., based on the user's preferences and consent (e.g., device settings and/or user server account options).

The user device displays a map portion 702 that indicates a current location 704 of the user, based on location data provided by the user device that is with the user. In this example, the displayed geographic area in map portion 702 is similar to the geographic region shown in FIG. 6.

The map portion 702 also indicates recommended geographic locations 706 which have been found to be relevant to the user's interests based on one or more features described herein. For example, based on the user's determined subjects of interest shown in the example of FIG. 5, and based on the site characteristics of the region as indicated in FIG. 6, the user device (and/or other devices in communication with the user device) has determined that locations 706 are relevant to the subjects of (photographic) interest to the user. For example, locations 706 are within a close geographic area surrounding the user. Locations 706 also are associated with interest-matching site characteristics in sufficient number to qualify as recommended locations, e.g., are associated with image labels indicating content that is of interest to the user. For example, such labels can include "ocean" (e.g., several images depicting the ocean were captured at locations 706), "park" (e.g., a park was detected in images captured at locations 706), etc. In some implementations, if relevant times are associated with the recommended locations (e.g., hours of operation of a service, limited time period to perform an activity or see a sight, etc.), such times can also be displayed in map portion 702 next to their respective locations and/or displayed in associated information areas 720.

User interface 700 can also display location information areas 720 which can provide additional information about the recommended locations 706. Each information area 720, for example, can display the distance to its associated location 706 from the user's current position, an image 722 depicting the location 706 or view associated with the location 706, descriptive information and relevant time periods about the location 706 (if available, e.g., from location cell data and/or from online or other information sources), etc. In some implementations, one or more images 722 displayed for a location 706 can be images that may have provided one or more of the site characteristics of the location used to compare against the user's subjects of interest.

In some implementations, the locations 706 shown in map portion 702 and/or the location information areas 720 are selectable by user input to the user device. For example, the user can provide direct touchscreen input on the user device displaying the user interface 700, move a displayed pointer using a control such as a mouse, trackball, or touchpad, designate a displayed element to be selected via a voice command, or provide other input to the device. Upon selection of a location 706 or information area 720, the display can change to focus on the selected location. An example is shown in FIG. 8.

FIG. 8 shows an example of the user interface 700 after the user has selected one of the recommended geographic locations 706 or information areas 720 shown in FIG. 7. In this example, distance information 802 and image 804 (a larger version of the associated image 722) are displayed in main display areas of the user interface 700. A reduced-size map portion 806 similar to the map portion 702 is displayed under the image 804, showing the selected location 706 and current user location 704. In some implementations, the other recommended locations 706 can be displayed upon command of the user. In one example, the user can "swipe" the image 804 and map portion 806 to the left with a finger gesture on a touchscreen of the device, and information including an image 810 and map portion 812 of the next recommended location 706 can be displayed, e.g., moved into view in the user interface 700 from the right of the display area.

Other implementations can provide recommended geographic locations that are recommended based on other subjects of interest to the user besides subjects related to photography and photographic content. For example, a user's interest in eating at restaurants, participating in particular sports, traveling on a particular mode of transport, or other activities or types of content experienced as such activities, can be determined based on the labels of the user's collection of images as described above, and geographic locations that are relevant to this interest can be determined and displayed similarly as described above.

Figure 9:
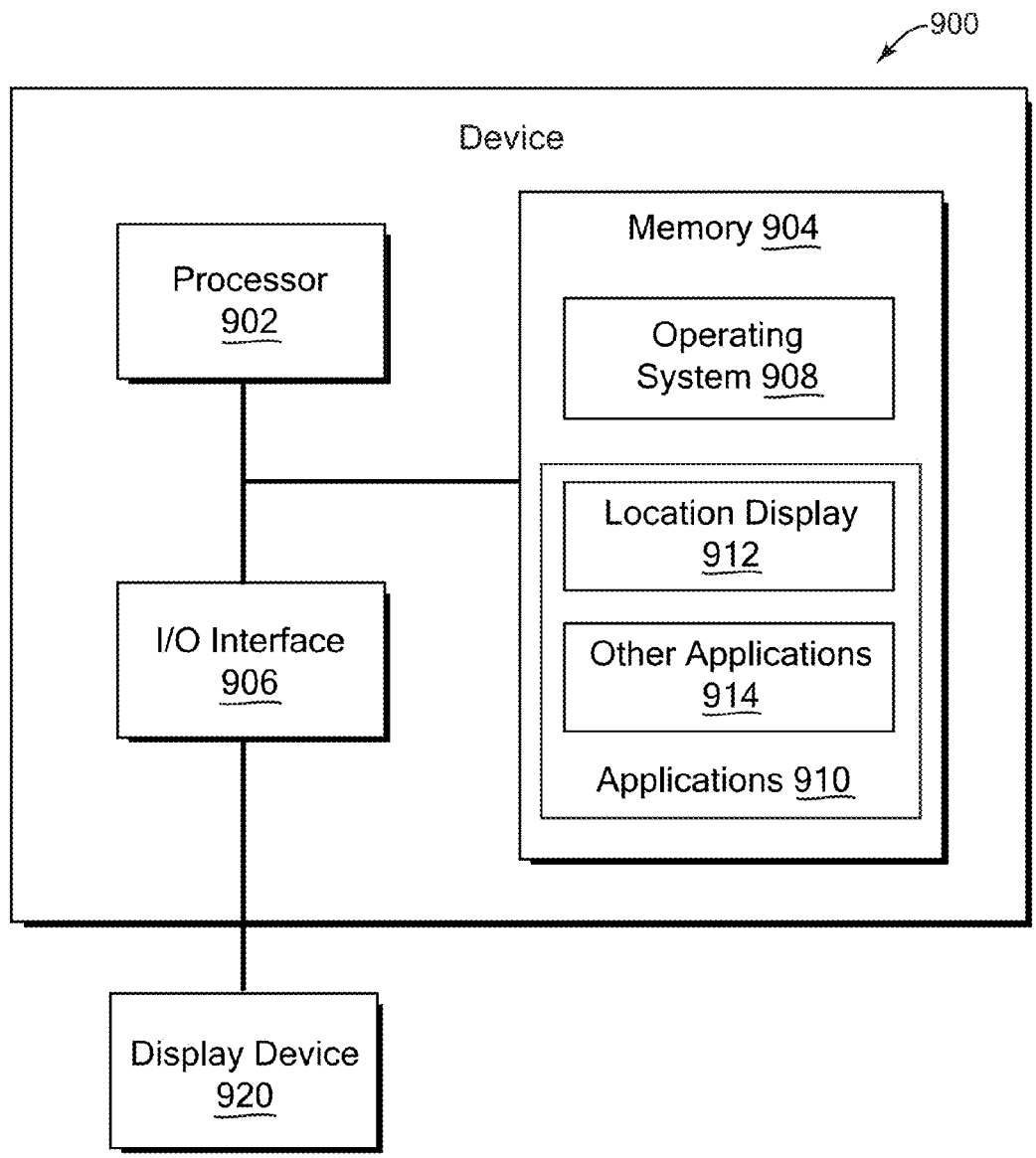
FIG. 9 is a block diagram of an example device which may be used for one or more implementations described herein.

FIG. 9 is a block diagram of an example device 900 which may be used to implement some implementations described herein. In one example, device 900 may be used to implement a computer device that implements a server device, e.g., server device 104 of FIG. 1, and perform appropriate method implementations described herein. Device 900 can be any suitable computer system, server, or other electronic or hardware device. For example, the device 900 can be a mainframe computer, desktop computer, workstation, portable computer, or electronic device (portable device, cell phone, smart phone, tablet computer, television, TV set top box, personal digital assistant (PDA), media player, game device, wearable device, remote control, handheld game- or device-controller, etc.).

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, device 900 includes a processor 902, a memory 904, and input/output (I/O) interface 906. Processor 902 can be one or more processors and/or processing circuits to execute program code and control basic operations of the device 900. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 904 is typically provided in device 900 for access by the processor 902, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 902 and/or integrated therewith. Memory 904 can store software operating on the server device 900 by the processor 902, including an operating system 908 and one or more applications 910 such as a data display engine, web hosting engine, image display engine, notification engine, social networking engine, etc. In some implementations, the applications engines 910 can include instructions that enable processor 902 to perform functions described herein, e.g., some or all of the methods of FIGS. 2-4. For example, applications 910 can include one or more location display applications 912, including a program to receive user input, obtain a geographic location of the device, obtain and display map and other location-related data, and provide output data causing display of location information on a display device of the device 900. A location display program, for example, can provide a displayed user interface responsive to user input to display selectable options/controls, location data, and images based on selected options. Other applications or engines 914 can also or alternatively be included in applications 910, e.g., image editing applications, media display applications, communication applications, web hosting engine or application, etc. One or more methods disclosed herein can operate in several environments and platforms, e.g., as a stand-alone computer program that can run on any type of computing device, as a web application having web pages, as a mobile application ("app") run on a mobile computing device, etc.

Any of software in memory 904 can alternatively be stored on any other suitable storage location or computer-readable medium. In addition, memory 904 (and/or other connected storage device(s)) can store images, image metadata (including location, time, labels, etc.), image identifiers, map and location data, data structures, label frequency information, and other information, user preferences, and/or other instructions and data used in the features described herein. Memory 904 and any other type of storage (magnetic disk, optical disk, magnetic tape, or other tangible media) can be considered "storage" or "storage devices."

I/O interface 906 can provide functions to enable interfacing the server device 900 with other systems and devices. For example, network communication devices, storage devices (e.g., memory and/or database 106), and input/output devices can communicate via interface 906. In some implementations, the I/O interface can connect to interface devices such as input devices (keyboard, pointing device, touchscreen, microphone, camera, scanner, etc.) and/or output devices (display device, speaker devices, printer, motor, etc.). Display device 920 is one example of an output device that can be used to display content, e.g., one or more locations and/or images provided in a user interface of an output application as described herein. Display device 920 can be connected to device 900 via local connections (e.g., display bus) and/or via networked connections and can be any suitable display device, some examples of which are described below.

For ease of illustration, FIG. 9 shows one block for each of processor 902, memory 904, I/O interface 906, and software blocks 908 and 910. These blocks may represent one or more processors or processing circuitries, operating systems, memories, I/O interfaces, applications, and/or software modules. In other implementations, server device 900 may not have all of the components shown and/or may have other elements including other types of elements instead of, or in addition to, those shown herein. While system 102 is described as performing blocks and operations as described in some implementations herein, any suitable component or combination of components of system 102 or similar system, or any suitable processor or processors associated with such a system, may perform the blocks and operations described.

A client device can also implement and/or be used with one or more features described herein, e.g., client devices 120-126 shown in FIG. 1. Example client devices can include some similar components as the device 900, such as processor(s) 902, memory 904, and I/O interface 906. An operating system, software and applications suitable for the client device can be provided in memory and used by the processor, e.g., location and image selection and display software, client group communication application software, etc. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device 920, for example, can be connected to or included in device 900 to display images as described herein, where such device can include any suitable display device such as an LCD, LED, or plasma display screen, CRT, television, monitor, touchscreen, 3-D display screen, or other visual display device. Some implementations can provide an audio output device, such as voice output or synthesis that speaks text.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

One or more systems and methods discussed herein do not require collection or usage of user personal information. In situations in which certain implementations discussed herein may collect or use personal information about users (e.g., user data, information about a user's social network, user's location and time, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information only upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:
   receiving an indication of a geographic user location of a user;
   accessing a collection of user images associated with the user, wherein the user images are associated with user collection descriptors that are descriptive of content depicted in the user images;
   determining one or more subjects of interest to the user based on examining the user collection descriptors of the collection of user images, wherein determining the one or more subjects of interest includes:
      determining frequencies of occurrence of the user collection descriptors associated with the collection of user images;
      obtaining aggregate frequencies of occurrence of population descriptors associated with a population of images associated with a plurality of users;
      determining distinctive image characteristics of the collection of user images to determine the one or more subjects of interest to the user, wherein the distinctive image characteristics are indicated by particular user collection descriptors of the user collection descriptors, wherein determining the distinctive image characteristics of the collection of user images includes:
         comparing the respective frequencies of occurrence of the user collection descriptors to the aggregate frequencies of occurrence of respective population descriptors of the population of images, wherein the respective population descriptors exactly match or semantically match the user collection descriptors, and
         selecting the particular user collection descriptors from the user collection descriptors, wherein the particular user collection descriptors have higher frequencies of occurrence in the collection of user images compared to the aggregate frequencies of occurrence of the respective population descriptors of the population of images;
   obtaining over a data network a plurality of site characteristics of a geographic area relative to the geographic user location, wherein the site characteristics are based on a plurality of images captured in the geographic area, wherein the site characteristics are indicated by metadata stored in association with the plurality of images, wherein the metadata includes descriptors of content depicted in the plurality of images;
   comparing the site characteristics of the geographic area to the one or more subjects of interest to the user;
   based on comparing the site characteristics to the one or more subjects of interest, determining one or more geographic locations in the geographic area that have one or more site characteristics that exactly match or semantically match the one or more subjects of interest to the user; and
   providing at least one of the one or more geographic locations to be output by a user device as at least one recommended location for the user.

2. The method of claim 1 wherein the aggregate frequencies of occurrence are average frequencies of occurrence of the population descriptors in the population of images.

3. The method of claim 1 further comprising selecting the geographic area based on the geographic area being within a threshold distance of the geographic user location.

4. The method of claim 1 wherein the one or more subjects of interest are determined based on images in the collection of user images that are determined to have been captured at a time of day that is within a particular time range of a current time of day.

5. The method of claim 1 wherein the one or more subjects of interest are determined based on images in the collection of user images that are determined to have been captured at locations that exclude a home location and a work location of the user.

6. The method of claim 1 wherein the one or more subjects of interest are associated with a user context of the user, wherein the one or more subjects of interest are determined based on images of the collection of user images that have metadata related to the user context.

7. The method of claim 1 wherein determining the one or more geographic locations includes determining that the one or more site characteristics are included in one or more categories in which the one or more subjects of interest are classified.

8. The method of claim 1 wherein the metadata stored in association with the plurality of images includes times of capture of the plurality of images.

9. The method of claim 1 wherein the site characteristics have a higher frequency of occurrence in the plurality of images captured in the geographic area compared to stored image characteristics of a set of images captured in a geographic region larger than the geographic area.

10. The method of claim 1 wherein the geographic user location is a current geographic location of the user device.

11. The method of claim 1 wherein the geographic user location is a designated geographic location determined based on user input received at the user device from the user.

12. A non-transitory computer readable medium having stored thereon software instructions that, when executed by a processor, cause the processor to perform operations including:
    accessing a collection of user images associated with a user, wherein the user images are associated with user collection descriptors that are descriptive of content depicted in the user images;
    determining frequencies of occurrence of the user collection descriptors associated with the collection of user images;
    obtaining aggregate frequencies of occurrence of population descriptors associated with a population of images associated with a plurality of users, and
    determining one or more subjects of interest to a user based on examining the user collection descriptors of the collection of user images associated with the user, wherein the one or more subjects of interest are based on particular user collection descriptors that have a frequency of occurrence in the user collection descriptors that meets a threshold frequency,
    wherein determining the one or more subjects of interest includes determining distinctive image characteristics of the collection of user images to determine the one or more subjects of interest, wherein the distinctive image characteristics are indicated by the particular user collection descriptors of the user collection descriptors, wherein determining the distinctive image characteristics of the collection of user images includes:
        comparing the respective frequencies of occurrence of the user collection descriptors to the aggregate frequencies of occurrence of respective population descriptors of the population of images, wherein the respective population descriptors exactly match or semantically match the user collection descriptors, and
        selecting the particular user collection descriptors from the user collection descriptors, wherein the particular user collection descriptors have higher frequencies of occurrence in the collection of user images compared to the aggregate frequencies of occurrence of the respective population descriptors of the population of images;
    obtaining an indication of a user context including a geographic location of a user device and a time associated with the user;
    determining a subset of the one or more subjects of interest that are associated with the user context;
    obtaining over a data network a plurality of site characteristics of a geographic area within a threshold distance of the geographic location, wherein the site characteristics are based on a plurality of images captured in the geographic area, wherein the site characteristics are indicated by metadata stored in association with the plurality of images, wherein the metadata includes descriptors of content depicted in the plurality of images;
    comparing the site characteristics of the geographic area to the subset of the one or more subjects of interest to the user;
    based on the comparing, determining one or more geographic locations in the geographic area that have one or more site characteristics that exactly match or semantically match at least one of the subset of one or more subjects of interest to the user; and
    providing at least one of the one or more geographic locations to be output by the user device as at least one recommended location for the user.

13. The computer readable medium of claim 12 wherein the geographic user location is one of:
    a current geographic location of the user device; or
    a designated geographic location determined based on user input received at the user device from the user.

14. The computer readable medium of claim 12 wherein determining the subset of the one or more subjects of interest that are associated with the user context includes selecting the subset of the one or more subjects of interest based on images of the collection of user images that have metadata related to the time of the user context.

15. The computer readable medium of claim 12 wherein determining the subset of the one or more subjects of interest that are associated with the user context includes selecting the subset of the one or more subjects of interest based on images of the collection of user images that have metadata associated with a type of the geographic location of the user context, wherein the type of the location includes one or more of: a restaurant, a store, and a park.

16. A system comprising:
    a storage device; and
    at least one processor configured to access the storage device and configured to perform operations comprising:
        receiving an indication of a context of a user including a geographic user location of a user;
        accessing a collection of user images associated with the user, wherein the user images are associated with user collection descriptors that are descriptive of content depicted in the user images;
        determining one or more subjects of interest to the user based on examining the user collection descriptors of the collection of user images, wherein determining the one or more subjects of interest includes:
            determining frequencies of occurrence of the user collection descriptors associated with the collection of user images;

obtaining aggregate frequencies of occurrence of population descriptors associated with a population of images associated with a plurality of users;

determining distinctive image characteristics of the collection of user images to determine the one or more subjects of interest to the user, wherein the distinctive image characteristics are indicated by particular user collection descriptors of the user collection descriptors, wherein determining the distinctive image characteristics of the collection of user images includes:

comparing the respective frequencies of occurrence of the user collection descriptors to the aggregate frequencies of occurrence of respective population descriptors of the population of images, wherein the respective population descriptors exactly match or semantically match the user collection descriptors, and selecting the particular user collection descriptors from the user collection descriptors, wherein the particular user collection descriptors have higher frequencies of occurrence in the collection of user images compared to the aggregate frequencies of occurrence of the respective population descriptors of the population of images;

obtaining over a data network a plurality of site characteristics of a geographic area within a threshold distance of the geographic user location, wherein the site characteristics are based on a plurality of images captured in the geographic area, wherein the site characteristics are indicated by metadata stored in association with the plurality of images, wherein the metadata includes descriptors of content depicted in the plurality of images;

comparing the site characteristics of the geographic area to the one or more subjects of interest to the user;

based on comparing the site characteristics to the one or more subjects of interest, determining one or more geographic locations in the geographic area that have one or more site characteristics that exactly match or semantically match the one or more subjects of interest to the user; and providing at least one of the one or more geographic locations to be output by a user device as at least one recommended location for the user.

17. The system of claim 16 wherein the metadata stored in association with the plurality of images includes times of capture of the plurality of images.

18. The system of claim 16 wherein the operation of determining one or more subjects of interest includes:

determining a status of the user, wherein the status of the user is one or more of: user is at a work location, user in on vacation, or a mode of transportation used by the user; and selecting subjects of interest associated with the status of the user, including basing the selection of the subjects of interest on at least one of the images of the collection of user images having a user collection descriptor associated with the status of the user.

19. The system of claim 16 wherein the geographic user location is one of:

a current geographic location of the user device; or a designated geographic location determined based on user input received at the user device from the user.

\* \* \* \* \*